(12) United States Patent
Hasegawa et al.

(10) Patent No.: US 7,104,784 B1
(45) Date of Patent: Sep. 12, 2006

(54) DEVICE AND METHOD FOR FEEDING FUEL

(75) Inventors: Toshiaki Hasegawa, Yokohama (JP); Susumu Mochida, Yokohama (JP); Toshihumi Hoshino, deceased, late of Fujisawa (DE); by Kiyoko Hoshino, legal representative, Fujisawa (JP)

(73) Assignee: Nippon Furnace Kogyo Kaisha, Ltd., Yokohoma (JP)

( * ) Notice: Subject to any disclaimer, the term of this patent is extended or adjusted under 35 U.S.C. 154(b) by 196 days.

(21) Appl. No.: 10/049,695

(22) PCT Filed: Aug. 16, 2000

(86) PCT No.: PCT/JP00/05464

§ 371 (c)(1),
(2), (4) Date: Sep. 23, 2002

(87) PCT Pub. No.: WO01/13042

PCT Pub. Date: Feb. 22, 2001

(30) Foreign Application Priority Data

Aug. 16, 1999 (JP) ................................. 11/229532
Aug. 16, 1999 (JP) ................................. 11/229535

(51) Int. Cl.
   *F27D 13/00* (2006.01)

(52) U.S. Cl. ................. 431/4; 431/9; 431/11; 431/116; 431/215; 432/182

(58) Field of Classification Search .................... 431/4, 431/9, 11, 115, 116, 215; 432/180–182
See application file for complete search history.

(56) References Cited

U.S. PATENT DOCUMENTS 4,995,807 A    2/1991   Rampley et al.

FOREIGN PATENT DOCUMENTS

| JP | 6193823  | 7/1994 |
| JP | 7103411  | 4/1995 |
| JP | 10219354 | 8/1998 |

*Primary Examiner*—Monica S. Carter
*Assistant Examiner*—James G. Barrow
(74) *Attorney, Agent, or Firm*—Dennison, Schultz Dougherty & MacDonald

(57) ABSTRACT

The present invention provides a fuel feeding apparatus and method for improving the controllability of mixing process and mixing ratio of fuel and combustion air, and a combustion system and method for effecting new combustion properties. The fuel feeding apparatus of the combustion system has fuel feeding means, combustion gas extraction means, steam supply means, mixing means and fuel gas introduction means. The combustion gas extraction means extracts combustion gas of a combustion area therefrom. The mixing means mixes the fuel of fuel feeding means with at least one of combustion gas extracted from the furnace and steam of a steam generator. The fuel gas introduction means introduces a mixed fluid of combustion gas, steam and fuel to the combustion area as a fuel gas, and allows the fuel gas to be mixed with the combustion air. A step of mixing the fuel with the combustion gas after extracted from the furnace and a step of mixing the fuel gas with the combustion air are stepwisely carried out, so that the controllability of mixing process and ratio of the air and fuel is improved. Such a control of fuel gas flow enables control of characteristics of flame and production of flame with new properties in the combustion area.

31 Claims, 25 Drawing Sheets

(A)

(B)

(C)

(A)

(B)

(A)

(B)

(A)

(B)

(A) combustion chamber 1

(B) combustion chamber 1

(A)

(B)

(A)

(B)

(A)

(B)

(A)

(B)

(A)

(B)

DEVICE AND METHOD FOR FEEDING FUEL

TECHNICAL FIELD OF THE INVENTION

The present invention relates to apparatus and method for feeding fuel, and more particularly, to such apparatus and method for improving controllability of mixing of fuel and combustion air, characteristics of combustion of fuel, and further, properties of flame in a combustion area, and so forth.

BACKGROUND OF THE INVENTION

An industrial furnace, such as a tubular furnace, metal heating furnace, ceramic industrial kiln, metal melting furnace, gasification melting furnace, boiler or a combustion heating type of heating apparatus, such as a radiant tube burner, is provided with fuel feeding means for feeding hydrocarbonaceous fuel, air supply means for supplying combustion air, and a combustion means for mixing the fuel and combustion air to burn the fuel, such as a burner. The fuel and combustion air mixed in the combustion means produce flame in a combustion area by diffusion combustion. In this kind of combustion means, the actual amount of combustion air is set to be an excess air ratio exceeding a theoretical amount of air for the fuel, and the mixing ratio of combustion air and fuel (air-fuel ratio) is, in general, set to be approximately 14~15. Generally, pre-mixing of fuel and combustion air before fed to a burner is not adopted, because of its possibility of unexpected back fire, and therefore, the combustion air and fuel are introduced into a burner throat or in-furnace area through an air delivery port and fuel injection port so as to be mainly mixed in a proximal zone of the burner. For instance, a burner is provided with a flame stabilizer of swirler type, flame holder type or the like, in order to desirably mix a fuel injection flow and an air flow having different flow rates. The flame stabilizer causes an ignitable high-temperature circulation flow in the mixing area of fuel and air, whereby it prevents blow-off of flame and ensures stability of flame.

On the other hand, combustion gas produced in a furnace circulates in the in-furnace area. The combustion gas in the furnace is exhausted therefrom as the combustion air and fuel enter into the furnace. The combustion gas still possesses a large amount of recoverable heat, and therefore, the combustion gas is exhausted to the ambient environment through a waste-heat recovery equipment, such as a heat exchanger, waste-heat boiler and the like. In general, such an equipment preheats combustion air or heats a fluid useful as a heat medium.

A part of in-furnace combustion gas forms an in-furnace re-circulation flow to be mixed with the combustion air and/or fuel injection flow, so that ignition of fuel is urged and a slow combustion reaction of a low oxygen density is promoted. Recently, mixing of combustion gas circulation flow with combustion air or fuel is considered to be important, since such mixing is effective to prevent a local heat of flame and restrict production of nitrogen oxide (NOx).

Mixing process and ratio of fuel injection flow, combustion air flow and combustion gas re-circulation flow are changed, depending on positions, structures and configurations of combustion air port and fuel injection port, and an arrangement and structure of combustion furnace, and so forth. Further, mixing control for various kinds of fluid in a furnace is closely associated with unexpected control parameters, such as change of furnace temperature, heat load, in-furnace circulation flow and so forth. Therefore, it is difficult to readily control the mixing process and ratio. Especially, as regards a combustion furnace which relatively often varies in heat load and furnace temperature in correspondence with its operating condition, mixing of combustion gas re-circulation flow with air and/or fuel might result in deterioration of combustion stability when the temperature of combustion air is lowered, and therefore, any countermeasure for overcoming this drawback is required. Thus, development of fuel feeding device is desired which enables optional and variable control of the mixing process and mixing ratio of fuel, combustion air and combustion gas, and which can normally optimize a combustion reaction in a combustion area.

Further, an extremely high-temperature air combustion method developed by the present applicant is known in the art, wherein combustion air is preheated up to a temperature equal to or higher than 800 degrees centigrade (deg. C.) and introduced into a mixing area or combustion area. A combustion mode of flame by the preheated air at a temperature equal to or higher than 800 deg. C. provides combustion stability in a combustion atmosphere with a wide range of air ratio, compared to a combustion mode of normal flame by air preheated to a temperature lower than 400 deg. C., or a combustion mode of transitional flame at a temperature of 400~800 deg. C. The combustion stability in the extremely high-temperature air combustion method is considered to result from its combustion characteristics entirely different from the conventional method, owing to increase of reaction rate by a higher temperature of preheated air. Especially, when the combustion air or mixed gas for combustion is heated to a temperature higher than the self-ignition temperature of fuel, a combustion reaction without necessity of external ignition means can be realized in an ignition process. Further, flame failure can be prevented in spite of substantial increase of combustion air flow speed, so that the combustion air can be fed to a combustion area or mixing area as a high speed air flow. Furthermore, although increase of flame volume and decrease of flame brightness in accordance with the extremely high-temperature air combustion method are observed in the combustion area, phenomenon of local heat generation is restricted, so that a temperature field in the combustion area is rendered uniform.

Conventional research of radiation and convection heat transfer effects with respect to heating apparatus such as a tubular furnace is mainly directed to development of a combustion system which can generate a desirable temperature field in a combustion area while preventing a local overheat of a heated tube, or improvement of an arrangement and structure of the tubes and so forth. However, mixing of air and fuel generally tends to depend on control of temperature, flow rate, flow velocity, direction of air flow and the like, and therefore, characteristics of flame in a combustion area substantially rely on properties and fluid characteristics of air flow. For example, since fuel and air taking a combustion reaction in a mixing area almost entirely burn near a burner, a flame is merely formed near the burner, and therefore, it is difficult for the flame to reach a zone near a heated subject. On the other hand, if a feeding pressure of fuel is increased or a diameter of fuel nozzle is reduced for increasing a distance of travel of fuel fluid, a blowing speed of the fuel may be increased. However, the flow rate of fuel fluid is greatly smaller than that of air flow, and therefore, owing to a power of a large amount of air, the power of fuel fluid flow is de-energized to lose its power immediately after its injection. Thus, it is difficult to increase a distance of travel of the fuel fluid.

On the contrary, according to the extremely high-temperature air combustion method as set forth above, an air ratio and air-fuel ratio can be reduced and a flow rate of circulation flow of in-furnace combustion gas can be increased, whereby a slow combustion reaction can be maintained in a furnace and a temperature field in the furnace can be rendered in a uniform condition. However, in this kind of combustion method, a supply velocity of air flow tends to be set in a relatively high value. Therefore, the tendency that the control of mixing of fuel and air depends on control of air flow is more significantly revealed.

In addition, it has been found, in the extremely high-temperature air combustion method, that a mixing condition of a fuel injection flow, combustion air flow and in-furnace circulation flow is an important factor for controlling a combustion reaction, and therefore, it is necessary to focus on the mixing control of these three kinds of fluids upon adoption of an arrangement of apparatus. However, it is difficult in practice to surely control the mixing of these fluids in dependence on a conventional combustion skill in which an in-furnace circulation flow of combustion gas is mixed with a fuel or air flow within an in-furnace area of the furnace. Thus, development of a new combustion skill is desired, in which controllability of fuel flow itself delivered into a furnace is improved, and a position, diffusing manner and reach of flame can be controlled in dependence on control of the fuel flow, and further, controllability of mixing position and mixing ratio of fuel, combustion air and combustion gas can be improved.

It is therefore an object of the present invention to provide a fuel feeding apparatus and method which can improve controllability of mixing process and mixing ratio of fuel and combustion air.

Another object of the present invention is to provide a fuel feeding apparatus and method which allow a fuel and combustion gas to be optionally mixed, independently of control of in-furnace combustion gas re-circulation flow.

Still another object of the present invention is to provide a fuel feeding apparatus and method which can produce a fuel gas having new combustion characteristics.

Another object of the present invention is to provide a combustion system and method which can improve controllability of fuel flow entering a combustion area and which enable control of characteristics of flame by control of fuel flow, and further, a heating apparatus and method which can control properties of flame acting on heated subjects.

DISCLOSURE OF THE INVENTION

To attain these objects, the present inventors found in a research that high temperature combustion gas extracted from a furnace is mixed with a fuel, or steam is added to the combustion gas for adjusting the content of steam in the combustion gas and the gas is then mixed with the fuel, or otherwise, high temperature steam is mixed with a fuel, whereby mixing of fuel and combustion gas can be surely controlled and a large quantity of fuel gas presenting new combustion characteristics can be produced. The present inventors achieved the present invention as described hereinbelow, based on such recognition.

The present invention provides an apparatus for feeding fuel which has fuel feeding means for feeding the fuel and combustion air supply means for supplying combustion air to a combustion area, said apparatus comprising:

mixing means for mixing the fuel of said fuel feeding means with combustion gas extracted from a furnace and/or steam of steam supply means; and fuel gas introduction means for introducing a mixed fluid of said fuel and said combustion gas and/or steam into said combustion area as a fuel gas so as to mix the fuel gas with said combustion air.

The present invention also provides a method for feeding fuel in which the fuel and combustion air is fed to a combustion area, said method comprising:

feeding combustion gas extracted from a furnace and/or steam of steam supply means to a mixing area;

feeding said fuel to said mixing area to produce a mixed fluid of the fuel and said combustion gas and/or steam; and introducing said mixed fluid into said combustion area as a fuel gas so as to mix the fuel gas with the combustion air, thereby causing a combustion reaction of said fuel gas in said combustion area.

According to the arrangement of the present invention, the fuel is mixed with either or both of combustion gas extracted from a furnace and steam of steam supply means. The step of mixing the fuel with the combustion gas and/or steam, and the step of mixing the mixed fluid with combustion air are stepwisely carried out, and therefore, flexibility and reliability of mixing control of fuel, combustion air and combustion gas and/or steam are significantly improved. A large quantity of mixed fluid containing a thin fuel component is produced in the mixing area of the fuel and combustion gas and/or steam. The mixed fluid is fed to the combustion area, as being a large quantity of fuel gas flow having a momentum controllable independently of in-furnace combustion gas circulation flow. Accordingly, the fuel gas flow introduced into the furnace can mix with the combustion air flow without being substantially subject to influence of in-furnace combustion gas circulation flow. Thus, mixing process and mixing ratio of fuel and combustion gas can be variably controlled, independently of control of in-furnace combustion gas re-circulation flow.

From another aspect of the present invention, this invention provides a combustion system comprising the apparatus for feeding fuel as set forth above, and combustion air supply means for feeding the combustion air to the combustion area. The present invention further provides a combustion method including the method for feeding fuel as set forth above, wherein said mixed fluid is introduced into the combustion area as the fuel gas, and the fuel gas is mixed with the combustion air to cause a combustion reaction of the fuel gas in the combustion area.

According to such an arrangement, a large quantity of fuel gas flow with an independently controllable momentum is introduced into the combustion area, so that the characteristics of flame produced in the combustion area can be controlled by control of fuel gas flow introduced into the combustion area as well as control of combustion air flow. Further, the fuel is preliminarily mixed with the combustion gas and/or steam, and thereafter, mixed with the combustion air, so that flexibility and reliability of mixing control of fuel and combustion air is significantly improved, in comparison with a conventional combustion method in which air and/or fuel is mixed with in-furnace circulation flow in the furnace.

From still another aspect of the present invention, this invention provides a heating apparatus comprising the combustion system of the aforesaid arrangement, and a heating method wherein a subject to be heated is heated by flame produced by the combustion method of aforesaid arrangement.

According to this invention, characteristics of flame produced in the combustion area can be controlled by controlling a relatively large quantity of fuel gas containing a thin fuel, whereby an exothermic combustion reaction in the combustion area can be adjusted, and radiation and convection heat transfer effects of flame acting on the heated subject can be improved.

In the present specification, the term reading "fuel gas" means a mixed gaseous fluid which comprises a fuel mixed with combustion gas and/or steam and which contains a fuel component having a combustion reactivity with combustion air. The fuel component in the fuel gas is activated by mixing with high-temperature combustion gas and/or steam, whereas the combustion gas of a low oxygen density restricts the combustion reaction of the fuel component. Such a fuel gas is introduced into the combustion area as being a high-temperature fuel gas of a low oxygen density containing an activated and thin fuel component, and presents new combustion characteristics different from those of a conventional fuel. For instance, the fuel gas introduced into the combustion area slowly takes a combustion reaction with the combustion air, without mixing with the in-furnace combustion gas, whereby a relatively low-temperature diffusion flame in a wide area, which restricts a local heat and production of nitrogen oxides (NOx), is produced in the furnace.

If desired, a part of combustion gas and/or steam may be mixed with combustion air. The combustion air, which is diluted with the combustion gas and/or steam to have a low oxygen density, is introduced into the combustion area to be mixed with the high-temperature fuel gas of a low oxygen density as set forth above. The fuel component contained in the fuel gas more slowly takes a combustion reaction with the combustion air of a low oxygen density so as to produce a low-temperature flame in a wide area with a local heat of flame being restricted.

Further, steam contained in the combustion gas, high-temperature steam heated by mixing or heat exchange with the high-temperature combustion gas, or high temperature steam heated up to a temperature equal to or higher than 700 deg. C. by independent steam heating means, causes a thermal decomposing reaction and/or a steam reforming reaction of fuel hydrocarbon, and therefore, the fuel hydrocarbon is reformed to a high quality reformed gas containing a relatively large quantity of hydrocarbon radical, hydrogen, carbon, carbon monoxide and so forth. Thus, it is possible to reform a relatively heavy gravity or low (or degraded) quality hydrocabonaceous fuel, such as heavy oil, to a light gravity or high (or good) quality hydrocabonaceous fuel, before the fuel is mixed with the combustion air.

BEST MODE FOR CARRYING OUT THE INVENTION

Figure 1:
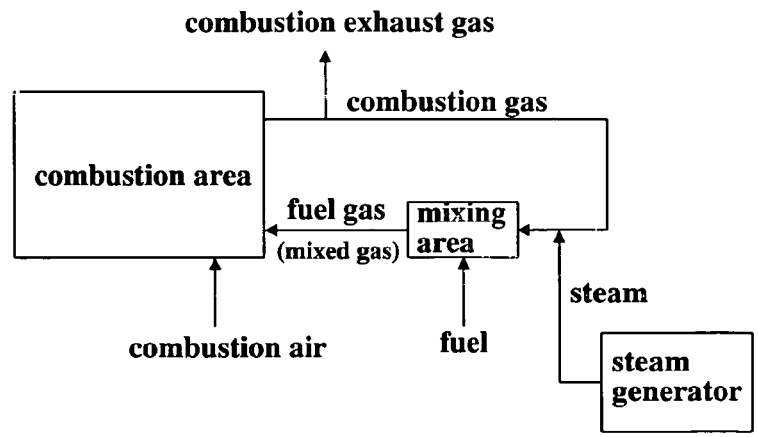
FIGS. 1 to 4 are block flow diagrams of fuel feeding apparatus illustrating preferred embodiments of the present invention.
Figure 1:
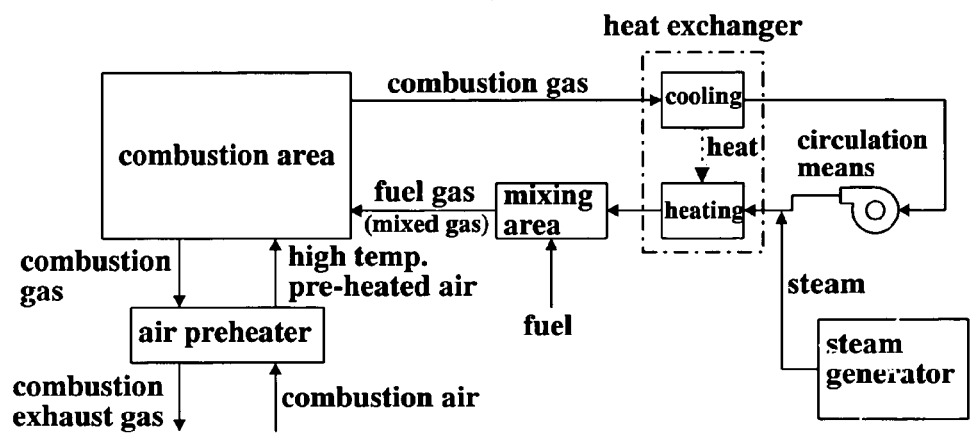
Figure 1:
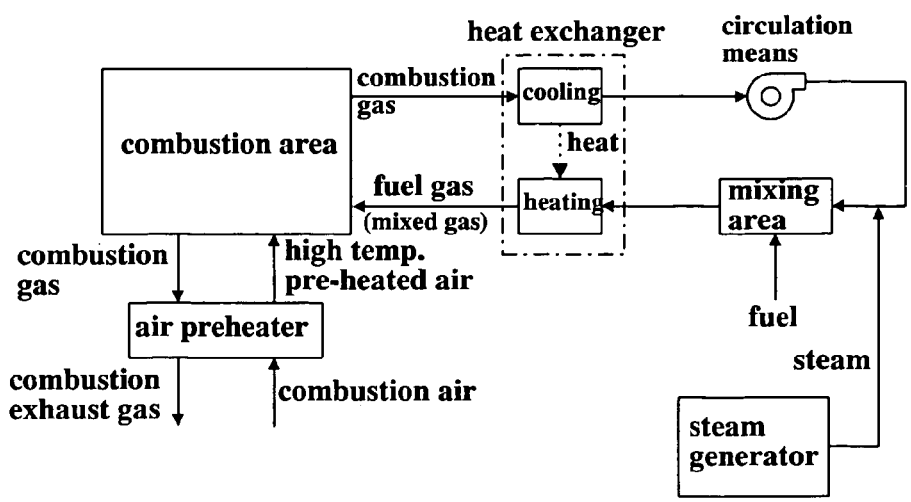

A fuel feeding device as shown in FIG. 1 (A) comprises a combustion gas extraction passage for extracting a combustion gas from a combustion area, a mixing area for a fuel and the combustion gas, and a fuel supply passage for feeding the fuel to the mixing area. The high-temperature combustion gas produced in the combustion area is extracted therefrom through the combustion gas extraction passage. A predetermined flow rate of combustion gas is exhausted out of the system as a combustion exhaust gas, and the reminder thereof is introduced into the mixing area. If desired, steam of a steam generator is injected into the combustion gas so as to adjust the content of steam in the combustion gas. A hydrocarbonaceous fuel is introduced into the mixing area through the fuel supply passage to be mixed with the combustion gas, so that a high temperature mixed gas (a fuel gas) comprising the fuel diluted with the combustion gas is produced in the mixing area.

In general, the combustion gas merely has a residual oxygen density in a range of 0%~10%, so that the fuel in the fuel supply passage is mixed with the combustion gas without substantially taking a combustion reaction with the combustion gas. The temperature of combustion gas is substantially equal to the temperature of combustion area, and therefore, the mixed gas containing a small quantity of low-temperature fuel still keeps a temperature slightly lower than the temperature of combustion gas, e.g., a temperature in a range of 800 deg. C.~1200 deg. C. In such a high-temperature mixed gas, the steam contained in the combustion gas reforms the fuel to activate the fuel. As a result, the fuel is apt to take a combustion reaction, compared to a fuel at a normal temperature. On the other hand, the combustion gas of a low oxygen density restricts the combustion reaction of the fuel.

The flow rate of combustion gas is extremely large in comparison with the flow rate of fuel feed, and therefore, the mixed gas is introduced into the combustion area as a large quantity of fuel gas containing a thin fuel. Combustion air is introduced into the combustion area through a combustion air supply passage, and the flow of mixed gas is mixed with the flow of combustion air in the combustion area to take a combustion reaction without being substantially subject to an influence of circulation flow of combustion gas.

A gaseous, liquid, solid or semi-solid fuel may be employed as the fuel. For instance, in a case where a hydrocabonaceous gaseous fuel such as methane is used as the above fuel, the gaseous fuel flows into the combustion area as being the high-temperature fuel gas diluted by the combustion gas. It is possible to produce a high quality reformed gas containing a relatively large quantity of hydrocarbon radical, hydrogen, carbon, carbon monoxide and the like by means of a thermal decomposition reaction and/or a steam reforming reaction of the fuel, which can be caused during the mixing and introduction processes of the fuel and combustion gas, and the reformed gas can be fed to the combustion area as being the fuel gas. Further, in a case where a hydrocabonaceous liquid fuel is used as the aforementioned fuel, a reforming reaction of the fuel including a vaporization and thermal decomposition processes occurs in the mixing area and introduction passage so that a high quality fuel gas (reformed gas) can be fed to the combustion area. Furthermore, in a case where a solid fuel, such as pulverized coal, is used as the fuel, the fuel is suspended in the high-temperature combustion gas and thermally decomposed in the mixing area and introduction passage, so that a high quality fuel gas containing hydrocarbon radical, hydrogen, carbon and carbon monoxide can be fed to the combustion area. It is considered that steam contained in the combustion gas substantially affects such a reforming action of the hydrocabonaceous fuel. Therefore, if desired, the aforementioned steam generator adds a quantity of steam to the combustion gas to increase the content of steam in the combustion gas, thereby promoting the steam reforming reaction of the fuel.

Figure 5:
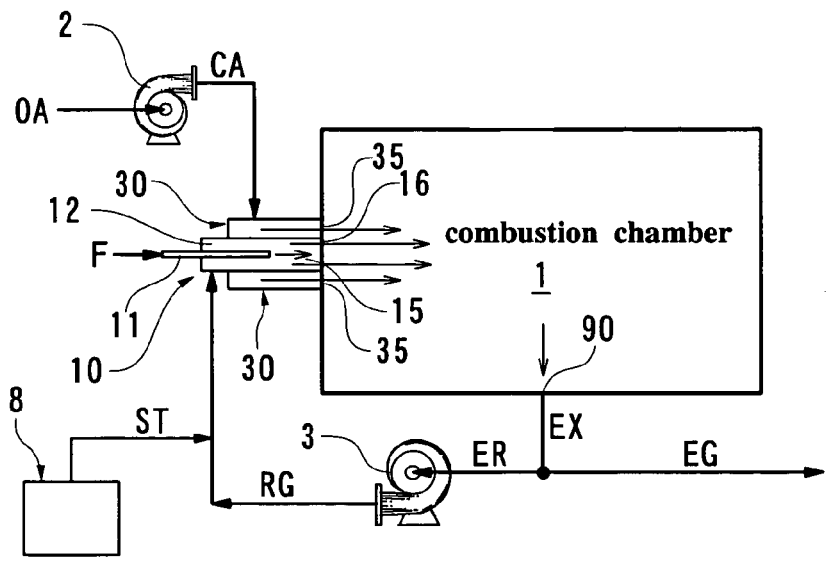
FIG. 5 is a schematic cross-sectional view of a combustion system provided with the fuel feeding apparatus as shown in FIGS. 1(A) and 1 (B).
Figure 5:
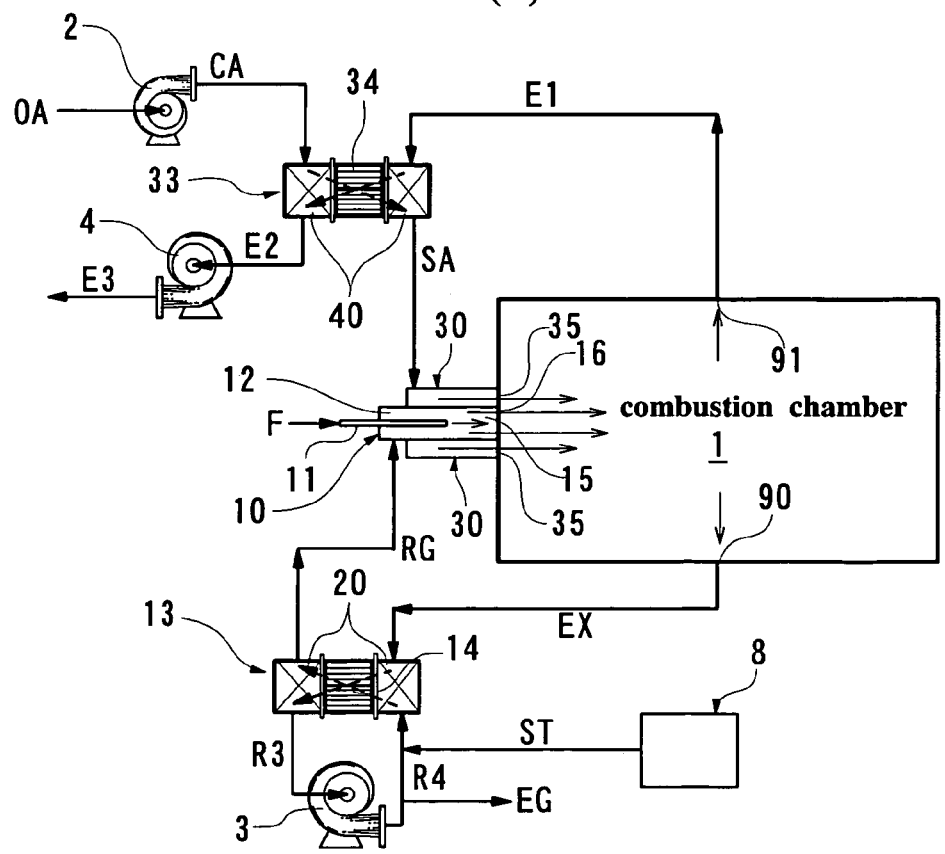

A schematic cross-sectional view of the combustion system provided with the fuel feeding apparatus as shown in FIG. 1(A) is illustrated in FIG. 5(A). The combustion apparatus is provided with a combustion chamber 1, a forced draft fan 2 and a combustion air supply device 30, and further, it includes a fuel mixing device 10 and an exhaust gas circulation fan 3 which constitute the fuel feeding apparatus. The fan 2 sucks a quantity of atmospheric air through an air intake passage OA and presses it into a combustion air supply passage CA. The combustion air supply device 30 has a combustion air outlet port 35 opening in the combustion chamber 1, and the combustion air in the passage CA flows into the chamber 1 through the outlet port 35. The fan 3 induces the combustion gas in the chamber 1 through a combustion gas extraction port 90 and combustion gas extraction passages EX, ER, and feeds the combustion gas to the fuel mixing device 10 through a combustion gas introduction passage RG. A steam generator 8 such as a steam boiler is connected with the passage RG by means of a steam supply passage ST, a quantity of superheated steam at a temperature of 150 deg. C.~300 deg. C. is injected into the gas to adjust the content of steam in the combustion gas. A part of combustion gas is exhausted out of the system through an exhaust gas passage EG.

The fuel mixing device 10 positioned inside of the combustion air supply device 30 has a fuel nozzle 11, a combustion gas introduction part 12, a mixing area 15 and a fuel injection port 16. The nozzle 11 is adapted to inject the feed fuel feed of a fuel supply passage F to the mixing area 15, the introduction part 12 introduces the combustion gas (and steam) of the passage RG into the mixing area 15. The mixing area 15 allows the fuel to be mixed with the combustion gas (and steam), and injects the mixed gas (fuel gas) into the combustion chamber 1. The flow rate, injection pressure and direction of the mixed gas to be injected into the chamber 1 are controlled by the flow rate, injection pressure and direction of the fuel and combustion gas injected by the nozzle 11 and introduction part 12, and they are restricted by the structure of the mixing area 15.

The mixed gas injected into the chamber 1 is mixed with the combustion air delivered from the combustion air supply device 30 to take a combustion reaction. The mixed gas at a flow rate roughly equal to a flow rate of the combustion air has a momentum corresponding to that of the combustion air flow, so that the mixed gas flows in a direction set by the fuel mixing device 10 and mixes with the combustion air, without being subject to a substantial influence of buoyancy due to a temperature variation, and direction and force of the combustion air flow. The combustion reaction of mixed gas is restricted by the combustion gas at a low oxygen density, and the mixed gas slowly takes a combustion reaction with the combustion air. Therefore, the mixed gas diffusing in the combustion area ensures its intended distance of travel, so that a flame is desirably produced in the predetermined in-furnace region without flame being locally and aggregately produced only in vicinity of the devices 10, 30.

According to such a fuel feeding method, a step of mixing the fuel with the combustion gas after extracted from a furnace and a step of further mixing the mixed fluid of fuel and combustion gas with the combustion air are stepwisely carried out. The composition and flow rate of mixed gas are variably controlled by the flow rate of combustion gas (and steam) to be introduced into the mixing area 15, the fuel feed rate of fuel supply passage F, and the mixing ratio of combustion gas and fuel. The mixing ratio is preferably set in a range between 1:1~20:1. Since the high-temperature mixed gas produced in the mixing area is fed to the combustion area as being a fuel gas having a flow rate considerably greater than that of fuel itself, the mixed gas mixes with the combustion air without being mixed with and de-energized by the in-furnace circulation flow of the combustion gas. Therefore, the mixing ratio, mixing position, mixing mode and combustion characteristics of fuel gas and combustion air can be controlled by adjusting both of the combustion air flow and fuel gas flow. The mixing ratio of the fuel gas and combustion air is preferably set in a range between 1:10~20:10. Further, the flow velocity of fuel gas entering the combustion area is preferably set in a range of 10~150 m/s. Thus, the flexibility and reliability of mixing control of the fuel, combustion air and combustion gas are considerably improved, since the mixing process and mixing ratio of fuel and combustion gas can be optionally controlled, without being substantially subject to the influence of recirculation flow of in-furnace combustion gas. In addition, a zone of combustion reaction, and a position and orientation of flame and the like can be controlled by control of the flow velocity, flow rate and direction of the mixed gas (fuel gas) which has been increased in volume by addition of the combustion gas (and steam).

Further, the aforementioned mixed gas is introduced into the combustion area as being a high-temperature fuel gas at a low oxygen density which contains activated and diluted fuel components, so as to take a slow combustion reaction with the combustion air. As a result, a diffusion combustion of relatively low-temperature flame in a wide area is generated within the furnace, which flame is advantageous in restriction of local exothermic heat and reduction of nitrogen oxides (NOx) production. In addition, the mixing ratio of fuel and combustion air can be variably controlled by the above fuel feeding device, in response to variation of the in-furnace temperature and heat load. This is practically advantageous in a heating furnace and the like in which the in-furnace temperature and heat load fluctuate.

Another embodiment of the present invention is shown in FIG. 1(B). In the fuel feeding device as shown in FIG. 1(B), the circuit including the extraction passage, mixing area and introduction passage is provided with circulation means for forcibly circulating a gaseous fluid, such as a forced circulation fan, and a heat exchanger for transitionally cooling the combustion gas in order to reduce the heat load and thermal stress of the circulation means. The heat exchanger comprises a cooling part for transitionally cooling the high-temperature combustion gas, and a heating part for re-heating the cooled combustion gas. The combustion gas extracted from the combustion area is cooled by the cooling part down to a temperature approximately in range of 200 deg. C.~300 deg. C., and the sensible heat gained in the cooling part is emitted to the cooled combustion gas by the heating part. The combustion gas cooled in the cooling part is, if desired, mixed with steam and thereafter, heated in the heating part up to a temperature equivalent to its temperature immediately after extraction. The combustion air is supplied to the combustion area through an air pre-heater which pre-heats the air to an extremely high-temperature range equal to or higher than 800 deg. C., preferably equal to or higher than 1000 deg. C.

FIG. 5(B) is a schematic cross-sectional view of the combustion system provided with the fuel feeding apparatus as shown in FIG. 1(B). The combustion system is provided with a combustion chamber 1, a forced circulation fan 2, an exhaust gas circulation fan 3, a steam generator 8, a fuel mixing device 10 and an air supply device 30 which are substantially the same as those shown in FIG. 5(A). The combustion system further comprises heat exchangers 13, 33 and a forced exhaust fan 4, and the heat exchangers 13, 33 have regenerators 14, 34 divided into a plurality of sections, respectively. The heat exchanger 13 constitutes a cooling part and heating part as shown in FIG. 1(B), and the heat exchanger 33 constitutes an air pre-heater as shown in FIG. 1(B). A high-cycle switching type of regenerative heat exchanger with a rotary disc type of passage change-over means 20,40 is preferably used as the heat exchanger 13,33 and a ceramic regenerator of a honey-comb structure provided with a large number of narrow fluid passages is preferably employed as the regenerator 13, 14. The construction of this kind of regenerator is disclosed in detail, e.g., in Japanese patent application No. 7-284825 (Japanese patent laid-open publication No. 9-126675) of the present applicant and therefore, a further detailed explanation thereon is omitted.

The fan 2 connected with an atmospheric air intake passage OA and an air supply passage CA introduces the combustion air into the heat exchanger 33. The fan 4 induces the combustion gas of the combustion chamber 1 through an exhaust passage E1, heat exchanger 33 and exhaust passage E2. The respective sections of regenerator 34 are alternately in heat-transfer contact with a high-temperature combustion exhaust gas and a low-temperature combustion air so that the sensible heat of combustion exhaust gas is transmitted to the combustion air to heat the air up to a high-temperature range equal to or higher than 800 deg. C. The high-temperature combustion air is fed to the air supply device 30 through a high-temperature air supply passage SA and the air flows into the combustion chamber 1 through an outlet port 35. The combustion exhaust gas of the exhaust passage E2 cooled down to a temperature range of approximately 200 deg. C.~300 deg. C. is exhausted out of the system through an exhaust passage E3.

The fan 3 connected with exhaust gas circulation passages R3, R4 induces the combustion gas of the combustion chamber 1 through a combustion gas extraction port 90, a combustion gas extraction passage EX and the heat exchanger 13. The section of the regenerator 14 at a low-temperature is in heat-transfer contact with the combustion gas at a high-temperature so that it accumulates the heat and cools the combustion gas. The cooled combustion gas is pressed by the fan 3 and if desired, is mixed with steam of the steam generator 8 and thereafter, is in heat-transfer contact with the high-temperature section of the regenerator 14 which has been heated with the heat accumulation. The combustion gas (and steam) cools the regenerator 14 and gains the heat therefrom to be heated up to the extremely high temperature range equal to or higher than 800 deg. C., preferably, equal to or higher than 1000 deg. C. The combustion gas is fed to the fuel mixing device 10 through a combustion gas introduction passage RG as being the high-temperature combustion gas. If desired, a part of the combustion gas is exhausted through an exhaust gas passage EG as a combustion exhaust gas.

According to the embodiments as shown in FIGS. 1(B) and 5(B), the fuel feeding device is provided with the circulation passage of the combustion gas EX, RG in which the heat exchanger 13 constituting the cooling part and heating part is interposed, and therefore, the heat load and thermal stress on the fan 3 are greatly relieved. Further, the fuel feeding device is in association with the heat exchanger 33 for pre-heating the combustion air to the aforementioned extremely high-temperature range so that the combustion area of the combustion chamber 1 is supplied with an extremely high-temperature pre-heated air.

In general, it is found that the combustion reaction by such an extremely high-temperature pre-heated air can be successfully performed in the existence of high speed flow of combustion air, and the velocity of the air flow can be set to be equal to or higher than 10 m/s. The high speed air flow activates the re-circulation of in-furnace combustion gas, and also forms an extensive combustion reaction zone in the combustion chamber 1. In addition, the mixed gas containing a large quantity of combustion gas of low oxygen density effects a self ignition when mixing with the combustion air pre-heated to the extremely high temperature, thereby generating a high-temperature combustion atmosphere of low oxygen density in the furnace. The fuel components contained in the mixed gas are subject to the effects of promotion of combustion reaction by the high-temperature combustion atmosphere, activation of fuel by pre-mixing with the combustion gas (and steam), restriction of combustion reaction involved in the low oxygen density, and extension of combustion reaction zone owing to the high speed flow, and the like, so that the fuel takes a slow combustion reaction in a wide area to create a relatively low temperature and extensive flame in the combustion area. Such a high-temperature combustion atmosphere of a low oxygen density is effective in restriction of local exothermic heat and reduction of nitrogen oxides (NOx) production.

Figure 6:
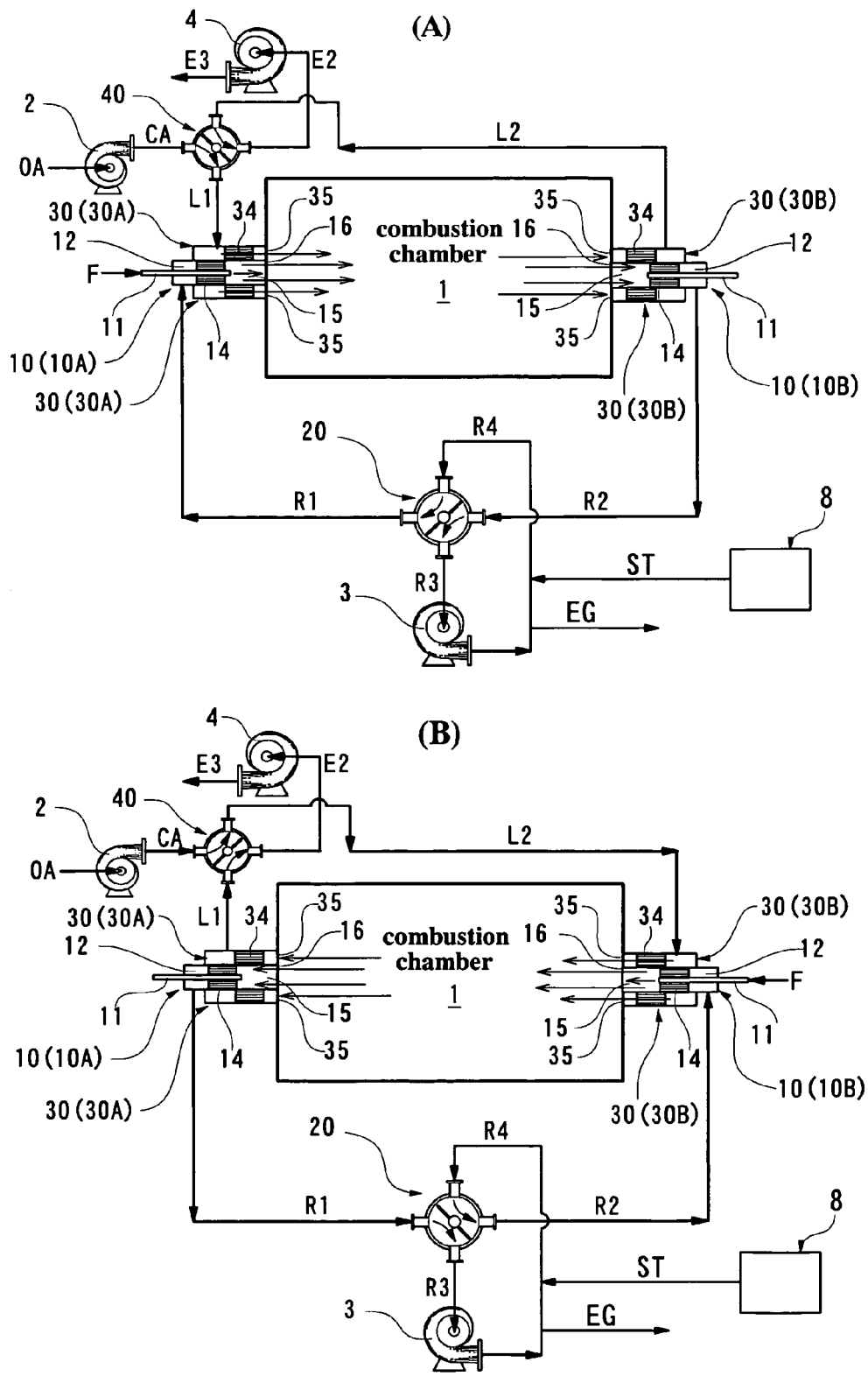
FIG. 6 is a schematic vertical cross-sectional view showing another arrangement of combustion system provided with the fuel feeding apparatus as shown in FIG. 1(B).

FIG. 6 is a schematic cross-sectional view of another combustion system provided with the fuel feeding device as shown in FIG. 1(B). FIG. 6(A) shows a first combustion step of the combustion system and FIG. 6(B) shows a second combustion step thereof. In FIG. 6, constituents, which are substantially the same as those of the aforementioned embodiments or equivalent thereto, are indicated by the same reference numerals.

The combustion system as shown in FIG. 6 is provided with a pair of fuel mixing devices 10A, 10B and a pair of air supply devices 30A, 30B. The combustion system differs from that shown in FIG. 5(B) in the construction of heat exchanger, wherein the fuel mixing device 10A, 10B contains a regenerator 14 and the air supply device 30A, 30B contains a regenerator 34, respectively. A ceramic regenerator with a honey-comb structure is preferably employed as the regenerator 14, 34. The combustion system is also provided with fluid passage change-over means 20 for switching the passage of combustion gas and fluid passage change-over means 40 for switching the passage of combustion air. The change-over means 20, 40 is alternately switched to either of the first position (FIG. 6A) and the second position (FIG. 6B) in a predetermined time interval, which is set to be no longer than 60 seconds.

In the first combustion step (FIG. 6A), an air draft fan 2 introduces the atmospheric air of an air intake passage OA into the change-over means 40 so that the combustion air is fed to the air supply device 30A through the passage L1. The combustion air is in heat-transfer contact with the regenerator 34 of the air supply device 30A to be heated up to the extremely high-temperature range as set forth above by the heat emission of the regenerator 34, and thereafter, the air flows into the combustion chamber 1 through an air outlet port 35. An exhaust fan 4 exhausts the combustion gas of the chamber 1 from the system through the air supply device 30B, a passage L2, the change-over means 40 and exhaust passages E2, E3. The regenerator 34 of the device 30B is heated in heat-transfer contact with the high-temperature combustion gas, and the combustion gas is cooled down.

An exhaust gas circulation fan 3 induces the combustion gas of the combustion chamber 1 through the fuel mixing device 10B, exhaust gas circulation passages R2, R3 and the change-over means 20, and feeds the combustion gas to the fuel mixing device 10A through the change-over means 20 and exhaust gas circulation passages R4, R1. The high-temperature combustion gas of the chamber 1 through the device 10B is cooled down in heat-transfer contact with the regenerator 14 of the device 10B, and the gas heats the regenerator 14. The cooled combustion gas is, if desired, mixed with a quantity of steam of a steam generator 8, and is fed to the device 10A under the circulation pressure of the fan 3 to flow through the regenerator 14 of the device 10A so as to be heated up to the extremely high-temperature range as set forth above by heat exchange with the high-temperature regenerator 14. A fuel nozzle 11 of the device 10A delivers the fuel to the heated combustion gas (and steam), so that the mixed gas of combustion gas and fuel enters into the combustion chamber 1 through a fuel gas injection port 16 as a fuel gas.

In the second combustion step (FIG. 6B), the combustion air is supplied to the air supply device 30B through the air intake passage OA, the air supply passage CA, the change-over means 40 and the passage L2. The combustion air is in heat-transfer contact with the regenerator 34 of the device 30B to be heated up to the extremely high-temperature range as set forth above, and the air flows into the combustion chamber 1 through the air outlet port 35 as the high-temperature combustion air. The exhaust fan 4 exhausts the combustion gas from the system through the air supply device 30A, the passage L1, the change-over means 40 and the exhaust passages E2, E3. The regenerator 34 of the device 30A is heated in heat-transfer contact with the high-temperature combustion gas, whereas the combustion gas is cooled down.

The exhaust gas circulation fan 3 induces the combustion gas of the combustion chamber 1 through the fuel mixing device 10B, the exhaust gas circulation passages R1, R3 and the change-over means 20, and feeds the combustion gas to the fuel mixing device 10B through the change-over means 20 and the exhaust gas circulation passages R4, R2. The high-temperature combustion gas of the chamber 1 is cooled down in heat-transfer contact with the regenerator 14 of the device 10A, and the gas heats the regenerator 14. The cooled combustion gas is, if desired, mixed with a quantity of steam of the steam generator 8, and is fed to the device 10B under the circulation pressure of the fan 3 to be heated up to the extremely high-temperature range as set forth above by heat exchange with the regenerator 14 of the device 10B. The fuel nozzle 11 of the device 10B delivers the fuel to the heated combustion gas (and steam), so that the mixed gas of combustion gas and fuel flows into the combustion chamber 1 through the fuel gas injection port 16 as a fuel gas.

Figure 7:
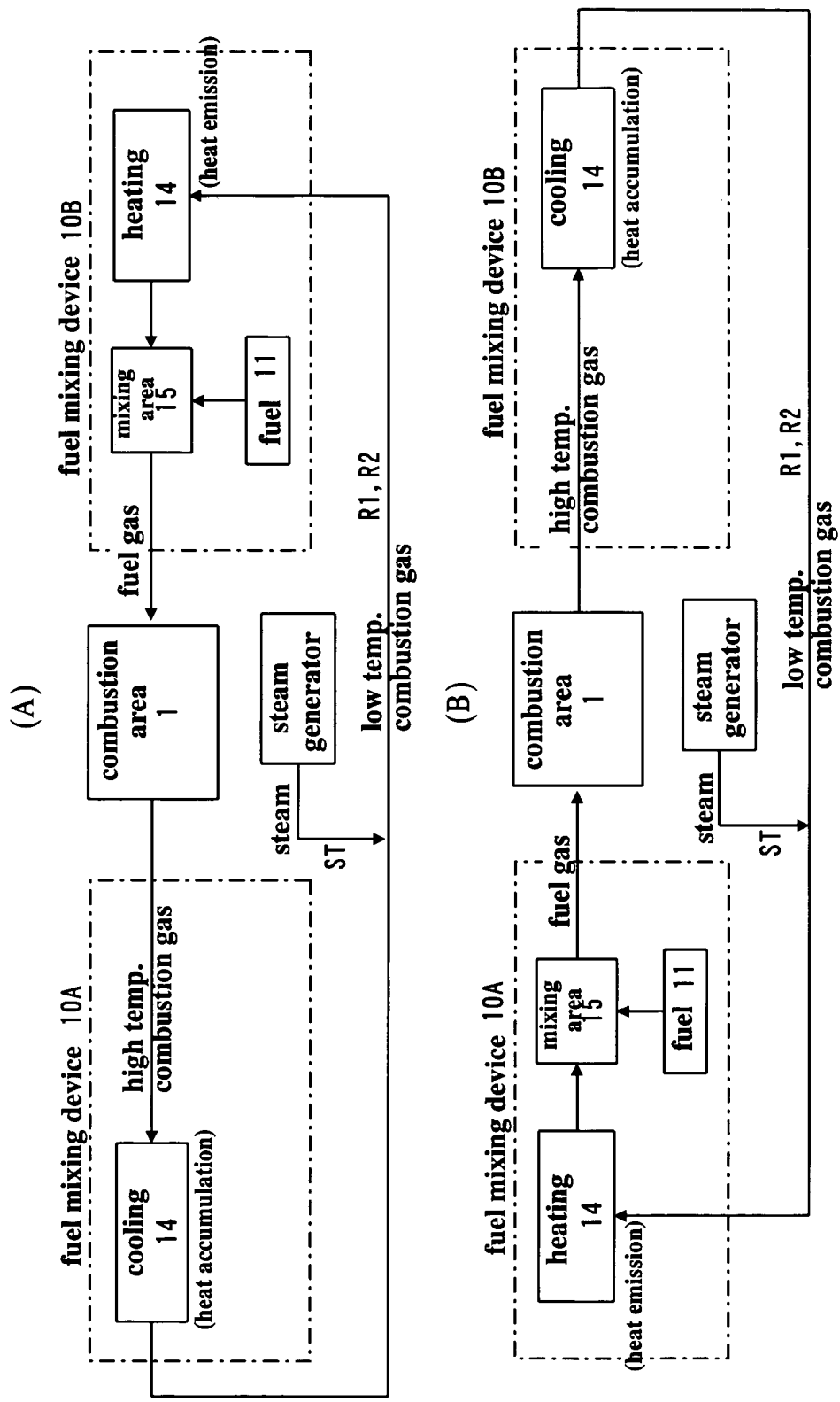
FIG. 7 is a block flow diagram schematically illustrating actions of the fuel mixing device as shown in FIG. 6.

FIG. 7 is a block flow diagram illustrating the action of the devices 10A, 10B as shown in FIG. 6. FIG. 7(A) shows the first combustion step of the combustion system and FIG. 7(B) shows the second combustion step thereof.

According to the arrangement of the aforementioned combustion system, the combustion gas of the combustion chamber 1 is extracted from the combustion area through one of the fuel mixing devices 10, and circulates through the passages R1, R2 under the circulation pressure of the fan 3, and if desired, a quantity of steam is added to the combustion gas. Then, the gas is fed to the other of the fuel mixing devices 10 to be reheated and mixed with the fuel, and is introduced into the combustion area as the fuel gas. The sensible heat of the high-temperature combustion gas is transitionally accumulated in the regenerator 14 when the gas exits the furnace, and the heat is emitted to the low-temperature combustion gas immediately before its mixing with the fuel. The first and second steps are repeatedly and alternately performed in a short time interval so that the combustion gas (and steam) is continuously cooled and reheated.

Similarly, the repeat of first and second steps allows the combustion air to constantly obtain the sensible heat of the combustion gas by means of the regenerator 34 (FIG. 6), and the air is continuously pre-heated up to the extremely high-temperature range. The mixed gas and combustion air are introduced into the combustion chamber through the adjacent devices 10, 30 respectively, and in the combustion area, a relatively low-temperature flame is created in a wide area, owing to a slow combustion reaction, increase of volume and velocity of fuel gas flow, increase of velocity of the combustion air flow.

Another embodiment according to the present invention is shown in FIG. 1(C). The fuel feeding apparatus as shown in FIG. 1(C) is provided with a cooling part and heating part for the combustion gas, and an air pre-heater, analogously to the embodiment shown in FIG. 1(B). In the present embodiment, the mixing area 15 is positioned between the heating part and a circulation device. According to this embodiment, a fuel is mixed with the combustion gas (and steam) cooled by the cooling part, and the mixed gas of the mixing area is heated in the heating part up to the extremely high-temperature as set forth above. The heating process of the mixed gas in the heating part causes a thermal decomposition reaction and a steam reforming reaction of the mixed gas, so that the mixed gas is reformed to a high quality fuel gas containing a relatively large quantity of hydrocarbon radical, hydrogen, carbon, carbon monoxide and the like.

Figure 8:
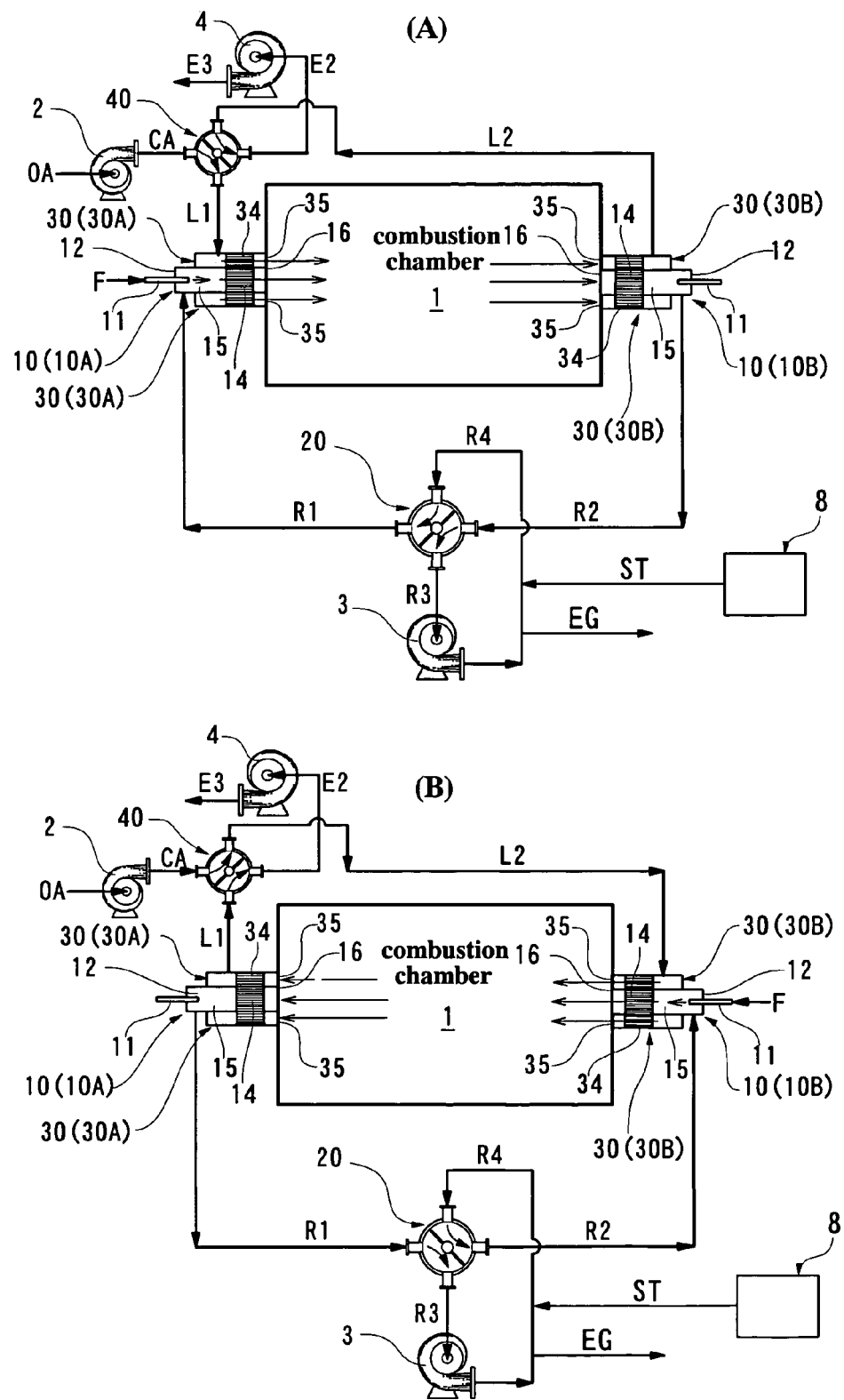
FIG. 8 is a schematic vertical cross-sectional view of a combustion system provided with the fuel feeding apparatus as shown in FIG. 1(C).

FIG. 8 is a schematic cross-sectional view of combustion system with the fuel feeding device having the arrangement as shown in FIG. 1(C). FIG. 8(A) shows a first combustion step of the combustion apparatus and FIG. 8(B) shows a second combustion step thereof. In FIG. 8, constituents, which are substantially the same as those of the aforementioned embodiments or equivalent thereto, are indicated by the same reference numerals.

The combustion system as shown in FIG. 8 is provided with fuel mixing devices 10A, 10B containing regenerators 14, and air supply devices 30A, 30B containing regenerators 34, and fluid passage change-over means 20, 40 for switching passages of fuel gas and combustion air. This is analogous to the combustion apparatus as shown in FIG. 6. However, in the combustion system shown in FIG. 8, the regenerator 14 is interposed between a combustion chamber 1 and a mixing area 15, so that narrow passages of the regenerator 14 allows the combustion chamber 1 to be in intercommunication with the mixing area 15.

In the first combustion step (FIG. 8A), a relatively low-temperature combustion gas (and steam) fed to a combustion gas introduction part 12 of the fuel mixing device 10A is mixed with a fuel delivered from a nozzle 11 of the device 10A, and the mixed gas of the combustion gas (and steam) and the fuel flows through the regenerator 14 of the device 10A, whereby the mixed gas is heated up to the extremely high-temperature range as set forth above by heat exchange with the regenerator 14. The high-temperature fuel gas enters into the combustion chamber 1 through a fuel gas injection port 16.

In the second combustion step (FIG. 8B), the relatively low-temperature combustion gas (and steam) fed to the combustion gas introduction part 12 of the fuel mixing device 10B is mixed with the fuel delivered from the nozzle 11 of the device 10B, and the mixed gas of the combustion gas (and steam) and the fuel flows through the regenerator 14 of the device 10B, whereby the mixed gas is heated up to the extremely high-temperature range as set forth above by heat exchange with the regenerator 14, and thereafter, enters into the combustion chamber 1 through the fuel gas injection port 16.

The mixed gas is heated while flowing through the regenerator 14 of the devices 10A, 10B and takes a thermal decomposition reaction to be reformed to a relatively high quality fuel gas. The mixed gas injected into the chamber 1 from the devices 10A, 10B is mixed with the high-temperature combustion air from an adjacent combustion air outlet port 35, so that an extensive flame is produced in the chamber 1 by the combustion atmosphere of a low oxygen density at a high-temperature.

Figure 2:
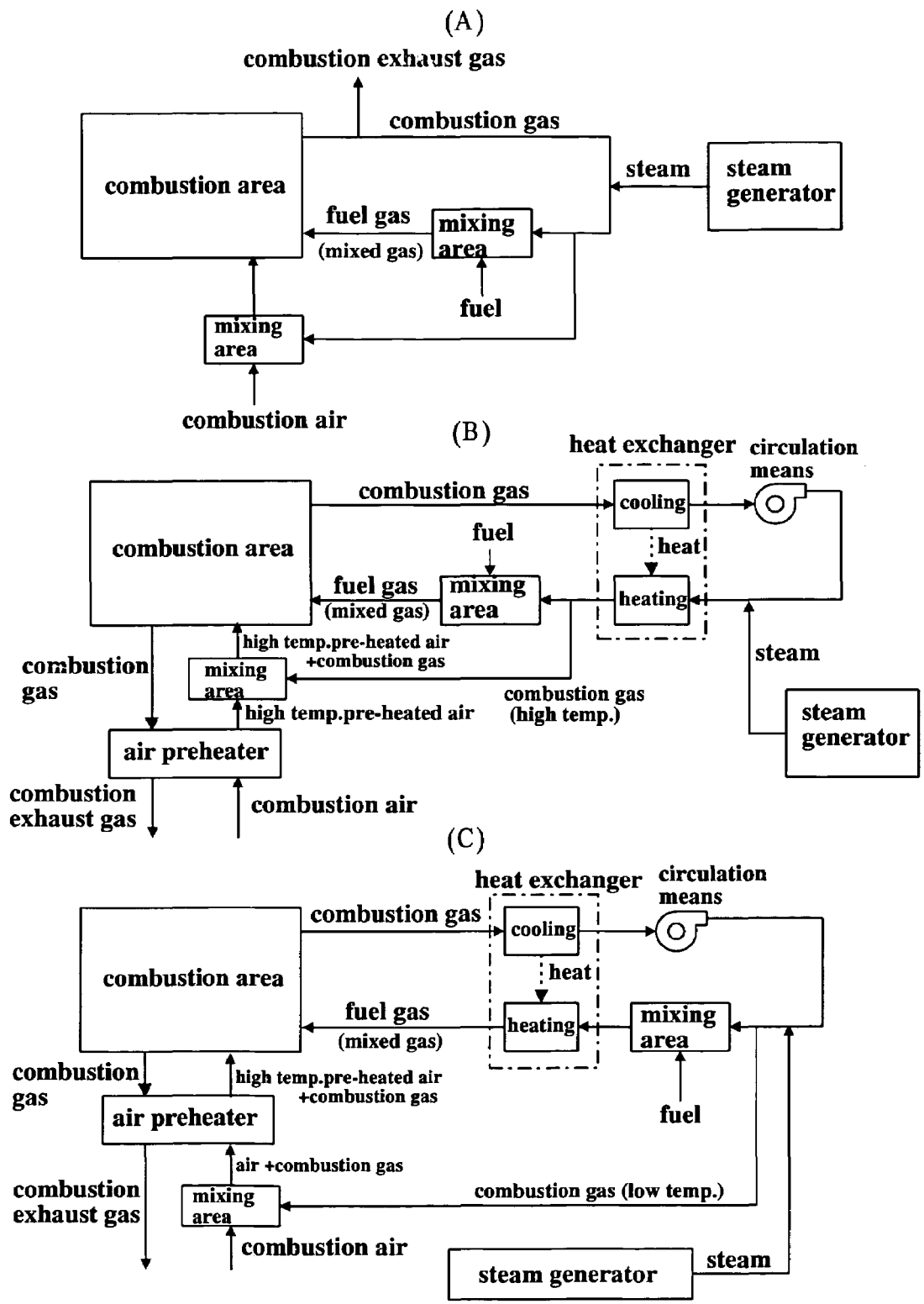

The other embodiments are shown in FIGS. 2(A), (B) and (C), which show arrangements generally corresponding to those in FIGS. 1(A), (B) and (C). However, in the embodiments in FIG. 2, a part of combustion gas is mixed with the combustion air. In the fuel feeding device as shown in FIG. 2(A), the combustion gas (and steam) extracted from a furnace is introduced into a mixing area for mixing with the combustion air as well as introduced into a mixing area for mixing with the fuel. The fuel feeding device as shown in FIG. 2(B) has a mixing area for mixing the high-temperature pre-heated air and combustion gas so that a part of a combustion gas (and steam) reheated in a heating part is mixed with the air pre-heated to an extremely high-temperature range by a high-temperature pre-heater. The fuel feeding device as shown in FIG. 2(C) has a mixing area for mixing a combustion air and a low-temperature combustion gas (and steam) so that a part of the combustion gas (and steam) cooled down to a temperature range of 200 deg. C.~300 deg. C. in a cooling part is mixed with the combustion air at a normal temperature before pre-heated to the high temperature.

According to this embodiment, the oxygen density of combustion air is lowered by mixing with the combustion gas (and steam) so that the combustion reactivity of the air is restricted. The air having a low oxygen density is mixed with the fuel gas of a low oxygen density which has been also diluted by the combustion gas, so that a combustion atmosphere at a low oxygen density is generated in the combustion area. As a result, a slow combustion reaction is caused in the combustion area so that an extensive and even flame is created therein.

Figure 9:
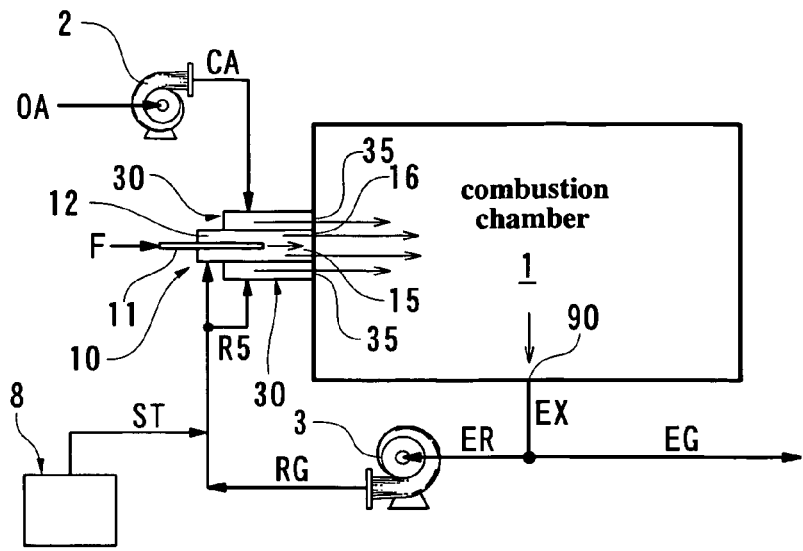
FIG. 9 is a schematic vertical cross-sectional view of a combustion system provided with the fuel feeding apparatus as shown in FIGS. 2(A) and 2(B).
Figure 9:
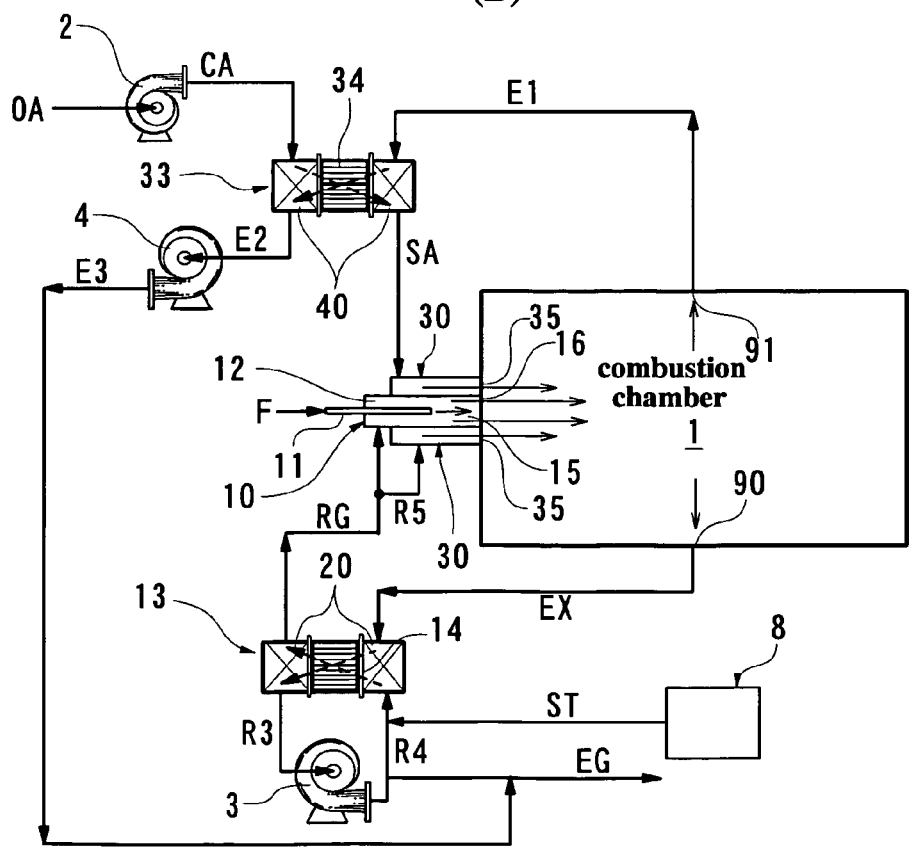
Figure 10:
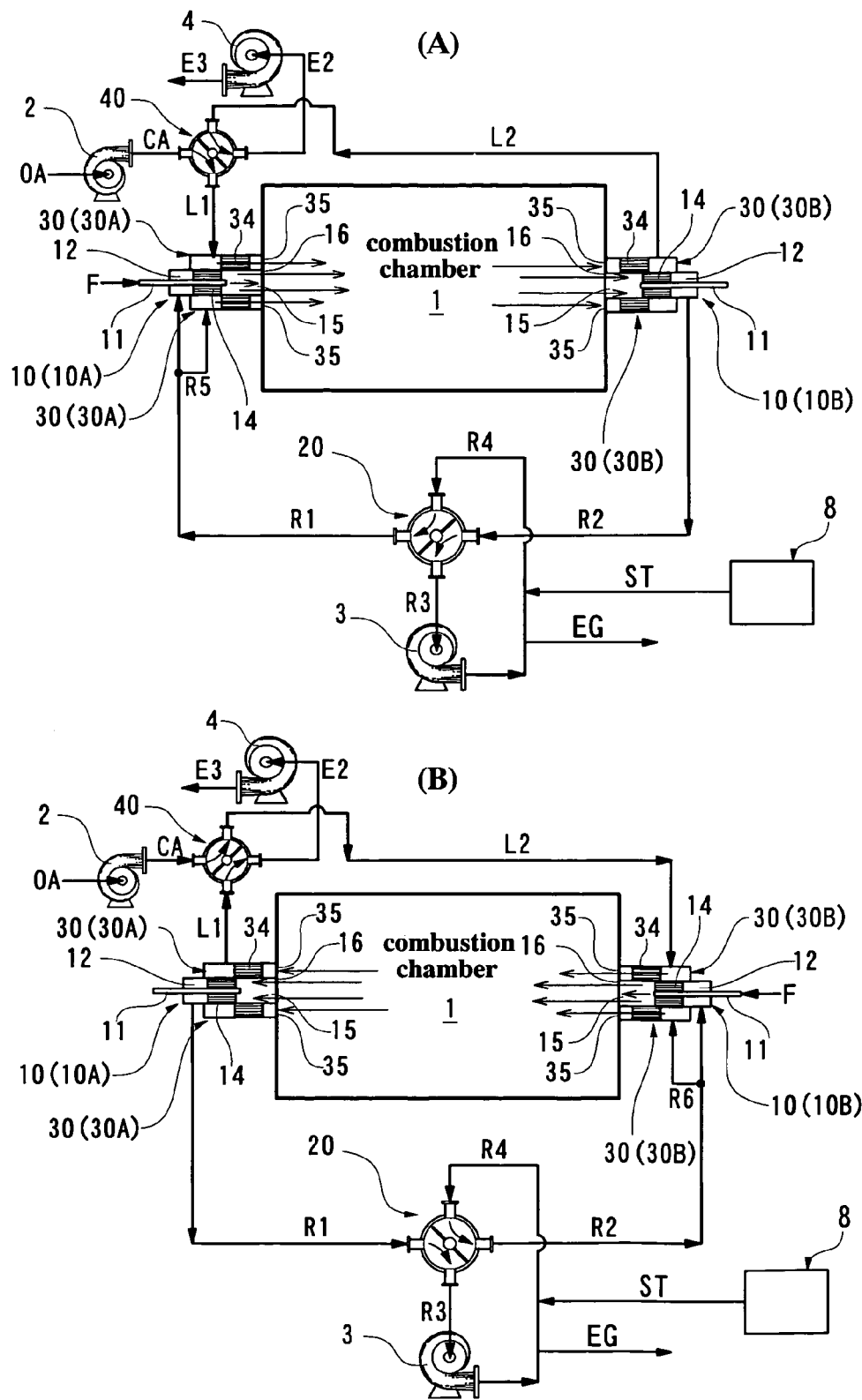
FIG. 10 is a schematic vertical cross-sectional view of a combustion system provided with the fuel feeding apparatus as shown in FIG. 2(B).

FIGS. 9(A), 9(B) and 10 are schematic cross-sectional views of combustion system with the fuel feeding device as shown in FIG. 2. In FIGS. 9 and 10, constituents, which are substantially the same as those of the aforementioned embodiments or equivalent thereto, are indicated by the same reference numerals.

The combustion system as shown in FIGS. 9(A) and 9(B) is provided with a shunt passage R5 of a combustion gas introduction passage RG connected to an air supply device 30. The combustion gas (and steam) through the passage RG is divided at the conjunction of the passage R5 and a part of the combustion gas (and steam) is mixed with the combustion air in the device 30.

In the combustion apparatus as shown in FIG. 10, a shunt passage R5 of an exhaust gas circulation passage R1 is connected to an air supply device 30A, and a shunt passage R6 of an exhaust gas circulation passage R2 is connected to an air supply device 30B. In a first combustion step (FIG. 10A), the combustion gas (and steam) of the passage R1 is partially introduced into the device 30A through the passage R5 to be mixed with the combustion air. In a second combustion step (FIG. 10B), the combustion gas (and steam) of the passage R2 is partially introduced into the device 30B through the passage R6 to be mixed with the combustion air.

The other embodiments are shown in FIGS. 3(A), (B) and (C). In these embodiments, an action of steam contained in the combustion gas is especially emphasized, and a quantity of steam is mixed with a fuel, the steam being heated to an extremely high temperature equal to or higher than a temperature of 700 deg. C., preferably 1000 deg. C., more preferably 1500 deg. C. That is, the aforementioned reforming reaction of hydrocarbon in the fuel is mainly considered to be effectively performed in existence of high-temperature steam contained in the combustion gas. In these embodiments, in order to develop such an action of the high temperature steam, the sensible heat of the combustion gas is transmitted to steam so as to heat the steam up to an extremely high-temperature equal to or higher than 700 deg. C., and the high-temperature steam is mixed with the fuel. The high-temperature steam acts as a reforming agent and a high-temperature heat medium, the fuel is reformed by such an action of high-temperature steam to be a high quality fuel containing a relatively large quantity of hydrocarbon radical, hydrogen, carbon, carbon monoxide and the like, and the fuel is mixed with the high-temperature combustion air to burn. In the combustion apparatus as shown in FIGS. 3(A) and 3(B), the combustion gas is exhausted from the system after heating the steam.

Figure 3:
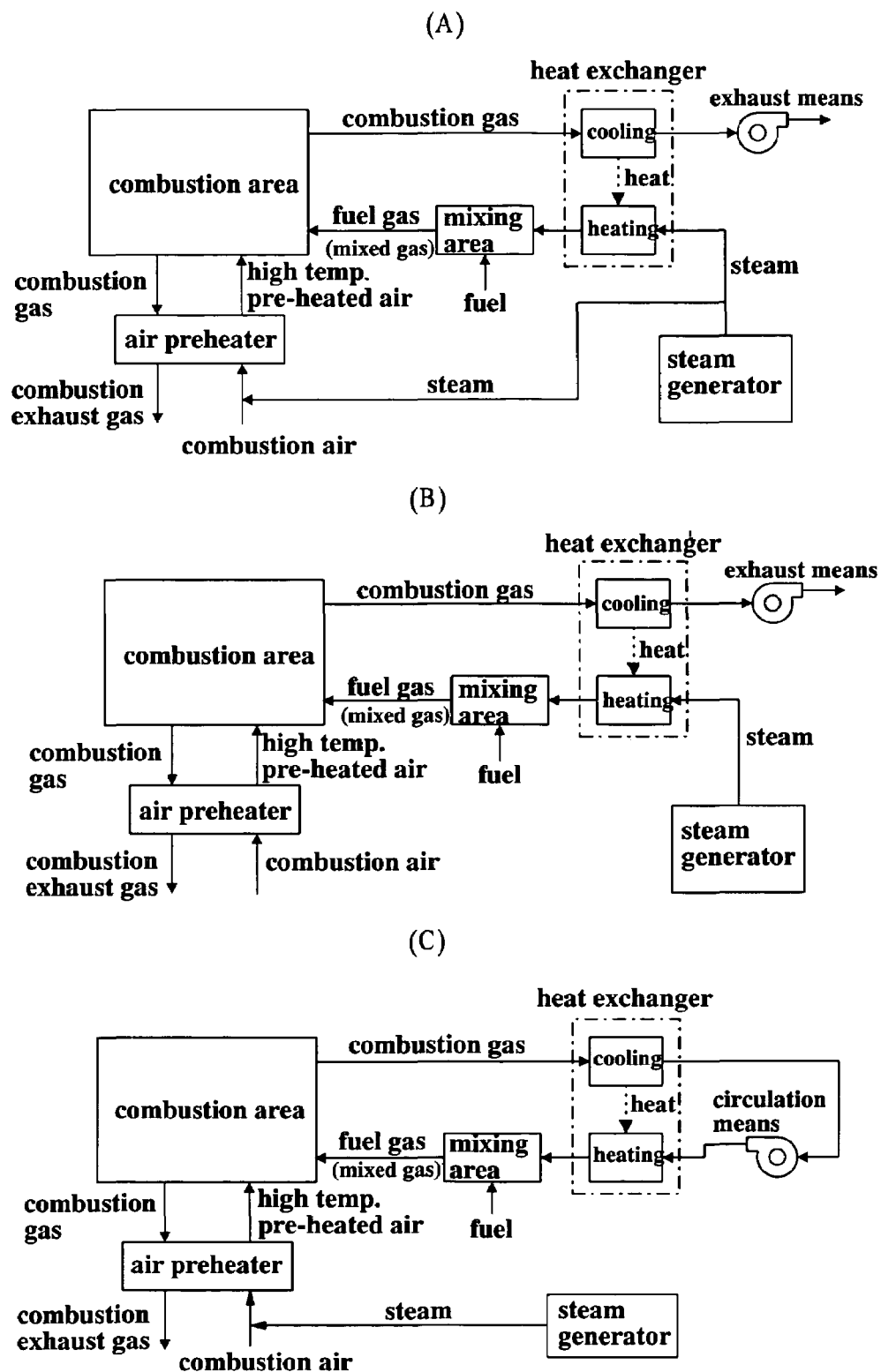
Figure 11:
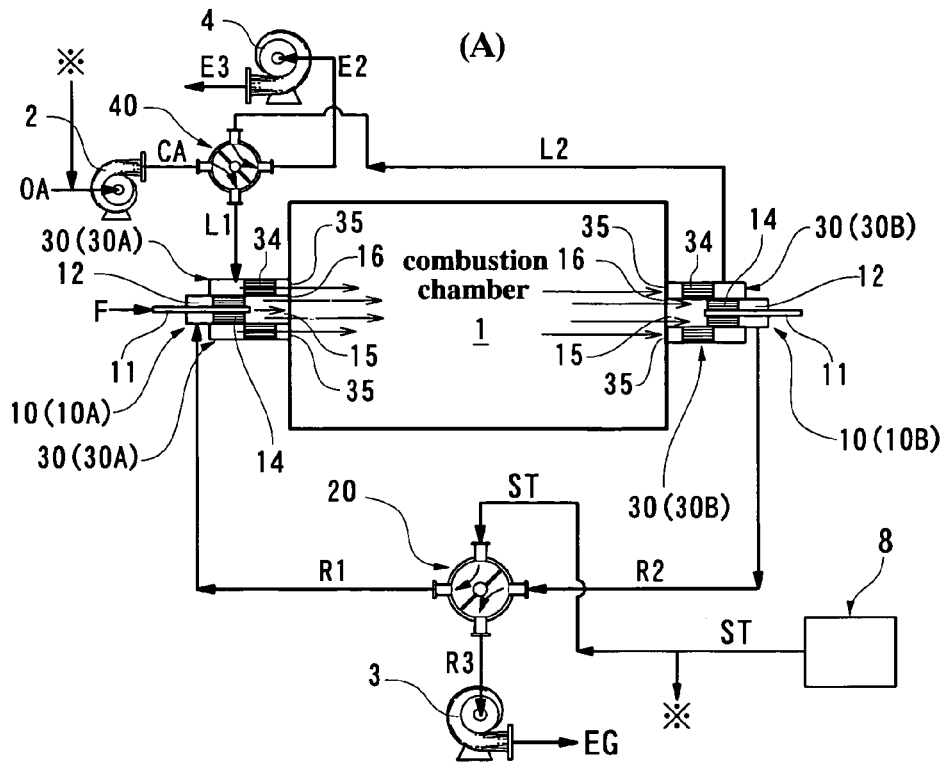
FIG. 11 is a schematic vertical cross-sectional view of a combustion system provided with the fuel feeding apparatus as shown in FIG. 3(A).
Figure 11:
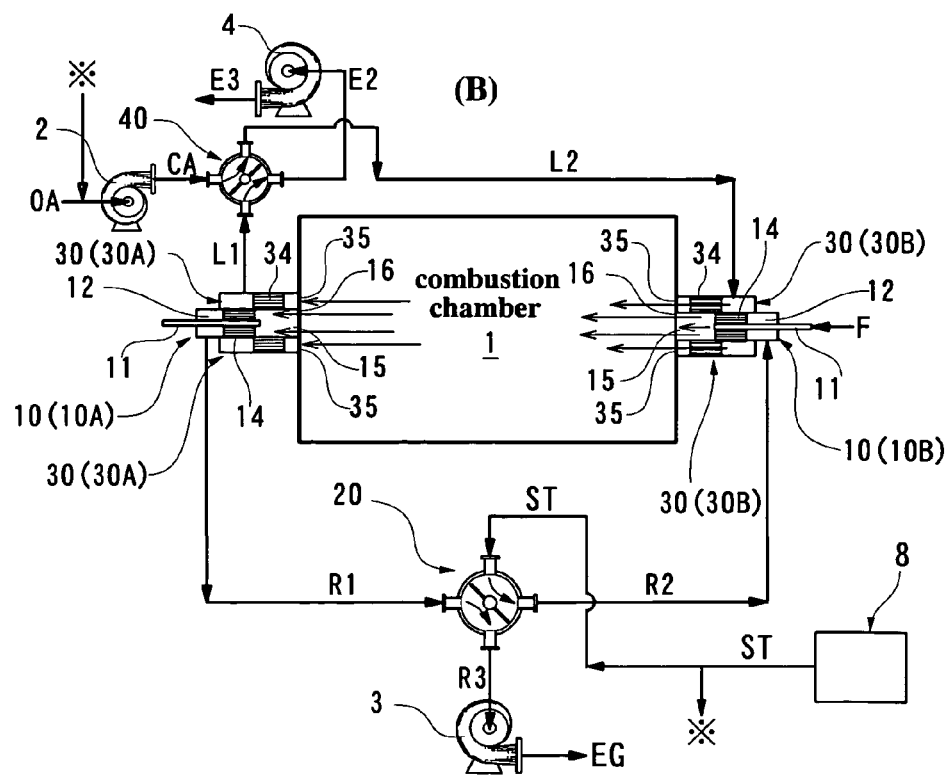
Figure 12:
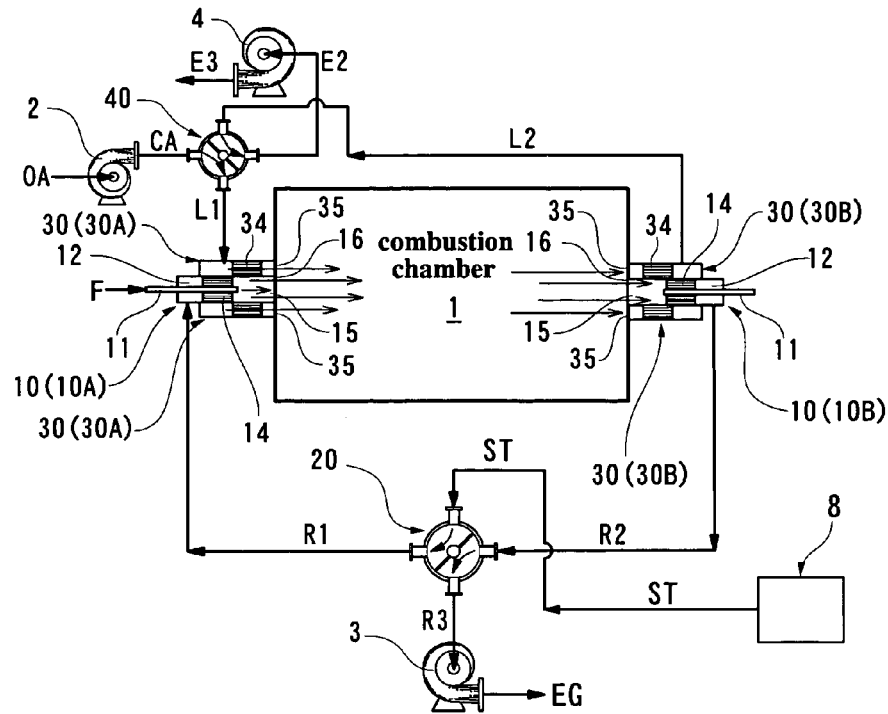
FIG. 12 is a schematic vertical cross-sectional view of a combustion system provided with the fuel feeding apparatus as shown in FIG. 3(B).
Figure 13:
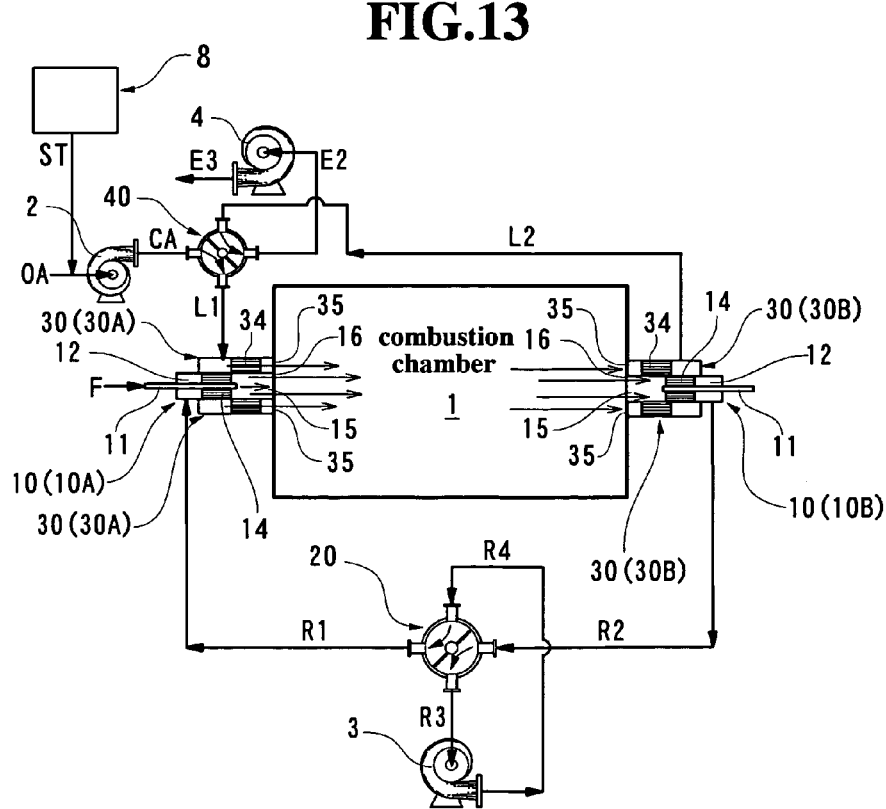
FIG. 13 is a schematic vertical cross-sectional view of a combustion system provided with the fuel feeding apparatus as shown in FIG. 3(C).

FIGS. 11, 12 and 13 are schematic cross-sectional views of combustion apparatus with the fuel feeding device having the arrangement as shown in FIG. 3. The combustion system as shown in each of FIGS. 11, 12 and 13 generally has an arrangement analogous to that shown in FIG. 6. However, a quantity of steam is supplied from a steam generator 8 to change-over means 20 and/or an air intake passage OA through a steam supply passage ST. The steam is heated up to a high-temperature equal to or higher than 700 deg. C. by heat-transfer contact with regenerators 14, 34, and thereafter, the steam is mixed with fuel. In FIG. 11, a first combustion step (FIG. 11A) of the combustion system and a second combustion step thereof (FIG. 11B) are illustrated, but only the first combustion step of the combustion system is shown in FIGS. 12 and 13.

Figure 4:
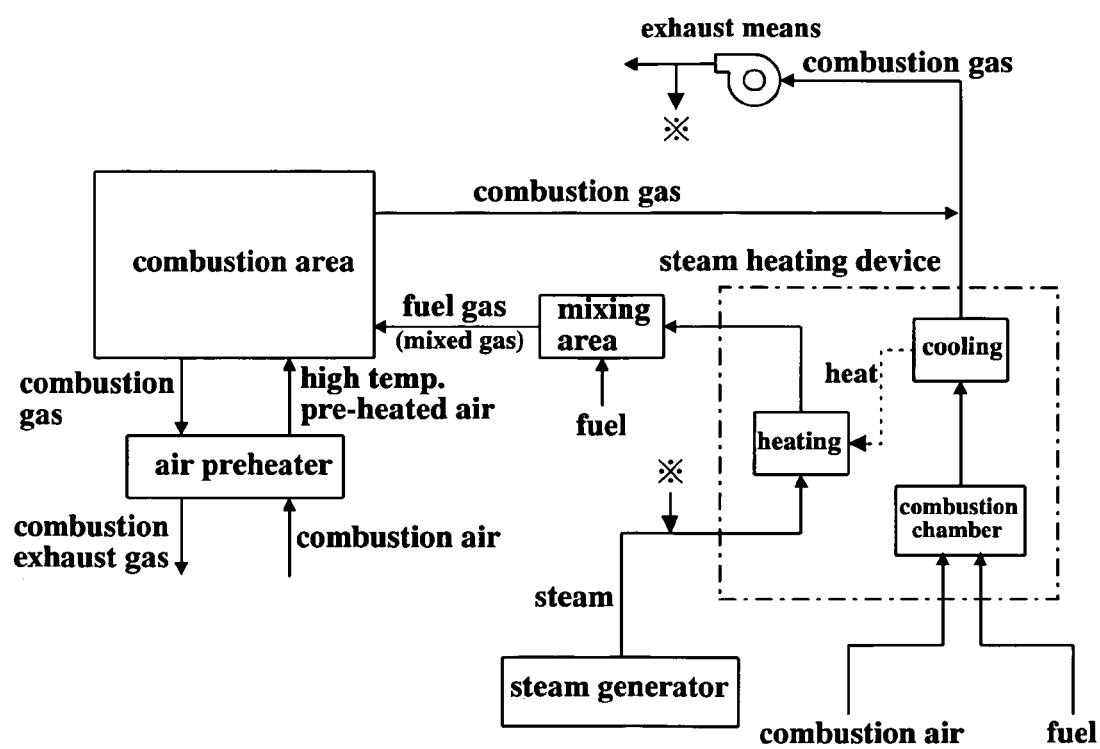

Another embodiment of the present invention is shown in FIG. 4. In a concept that the high-temperature steam is mixed with the fuel to promote the reforming reaction of the fuel, the combustion system illustrated in FIG. 4 is similar to that shown in FIG. 3. However, the fuel feeding device of this embodiment further comprises a steam heating device for heating steam to a high-temperature. A fuel and combustion air for heating steam is fed to a combustion chamber of the steam heating device, and the steam of the steam generator is supplied to the combustion chamber of the steam heating device. The steam gains the combustion heat in the combustion chamber to be heated to a high-temperature equal to or higher than 700 deg. C. The high-temperature steam is fed to a mixing area so as to be mixed with a fuel to reform the fuel. The mixed gas of the fuel and steam as a high quality fuel gas is further mixed with high-temperature air to burn in a combustion area of the combustion system.

Figure 14:
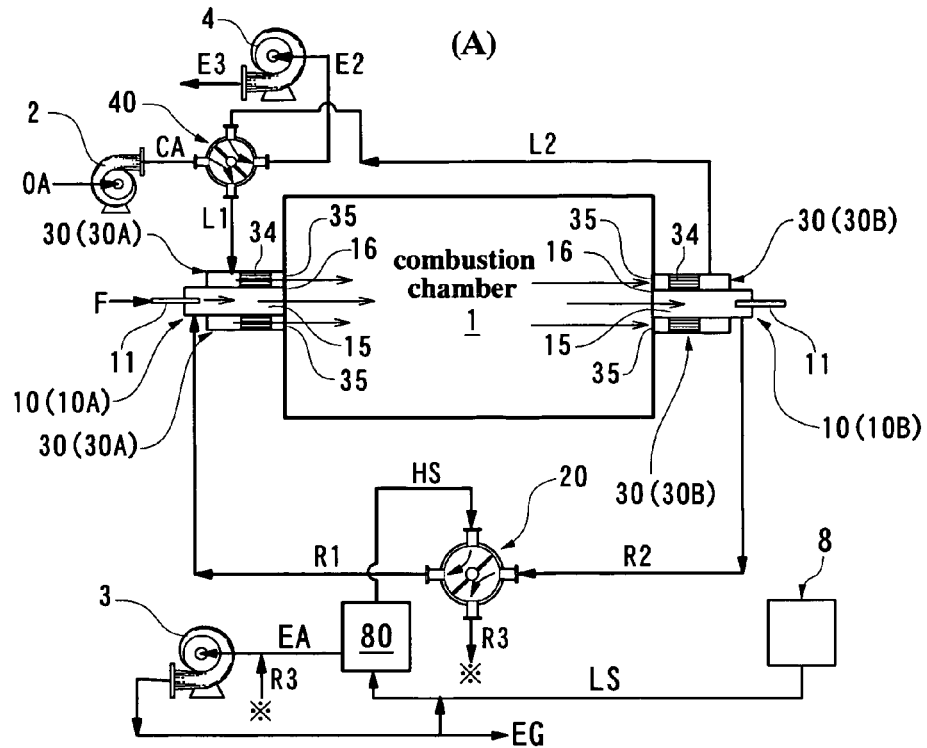
FIG. 14 is a schematic vertical cross-sectional view of a combustion system provided with the fuel feeding apparatus as shown in FIG. 4.
Figure 14:
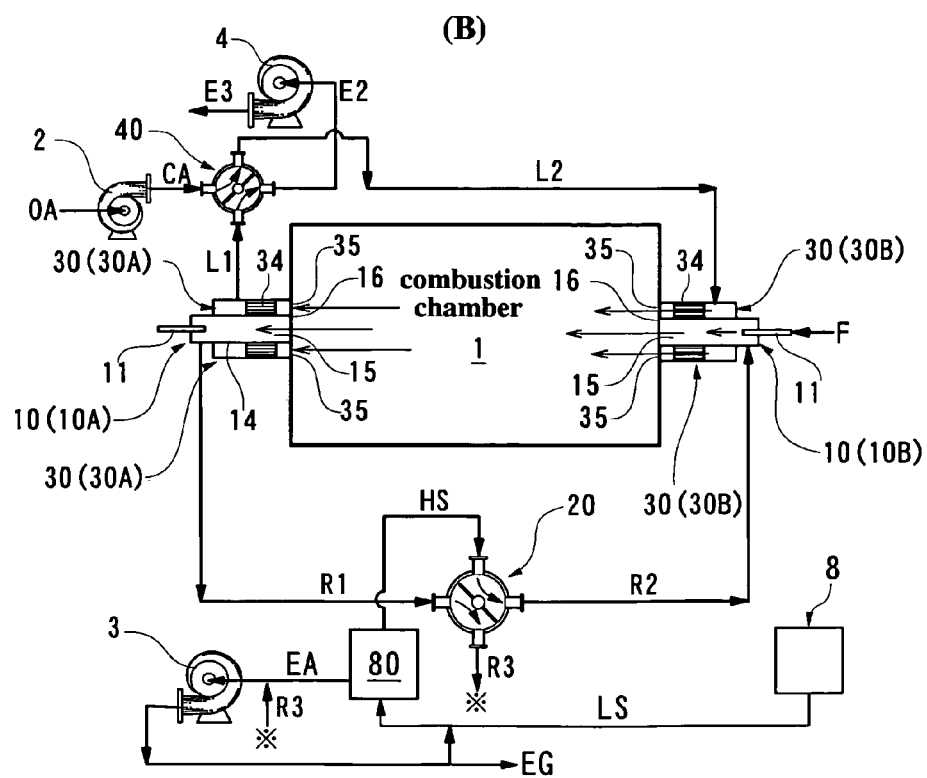
Figure 15:
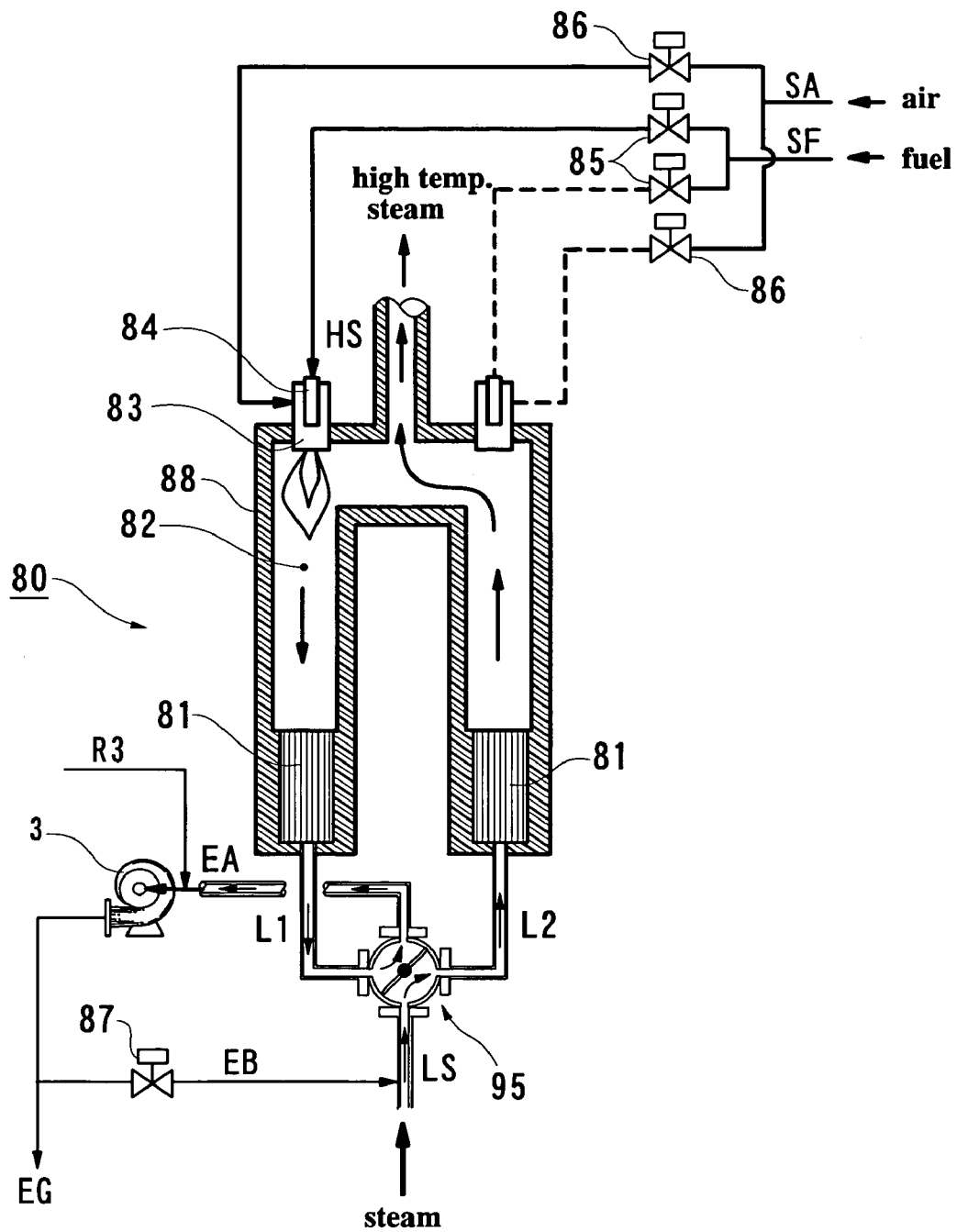
FIGS. 15 and 16 are cross-sectional views of a steam heating device as shown in FIG. 14.
Figure 16:
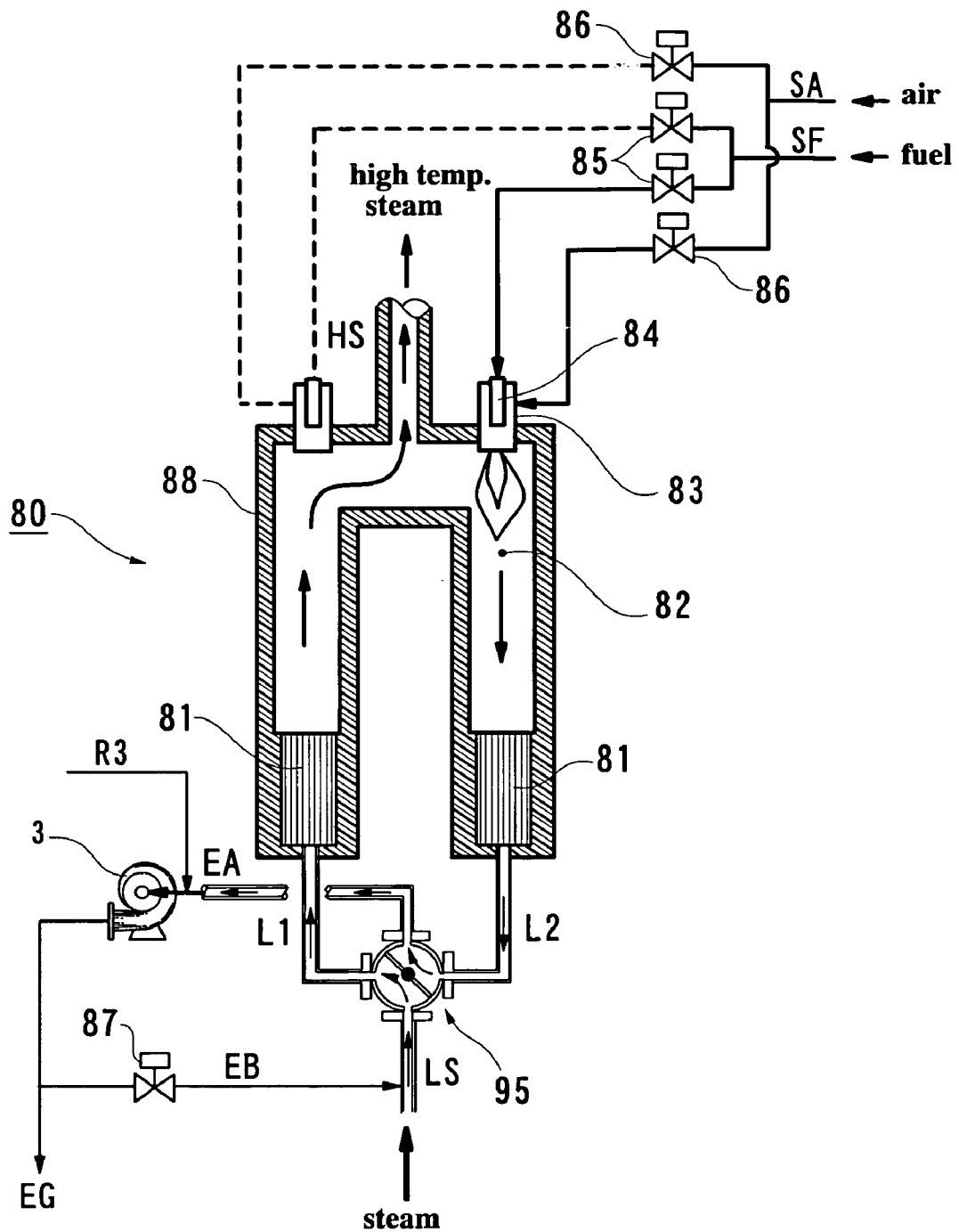

FIG. 14 is a schematic cross-sectional view of combustion system with the fuel feeding device having the arrangement as shown in FIG. 4, and FIGS. 15 and 16 are cross-sectional views showing a structure of the steam heating device. As illustrated in FIG. 14, the steam heating device 80 is connected with a steam generator 8 through a steam supply passage LS, and connected with change-over means 20 through a high temperature steam supply passage HS.

The high-temperature steam is introduced into a mixing area 15 of a fuel mixing device 10A in a first combustion step (FIG. 14A), and introduced into a mixing area 15 of a fuel mixing device 10B in a second combustion step (FIG. 14B). In either step, the high-temperature steam is mixed with a fuel delivered from a fuel nozzle 11 and thereafter, flows into a combustion chamber 1 through a fuel gas injection port 16. The high-temperature steam generates a high temperature atmosphere in the mixing area 15 and takes a steam reforming reaction with the hydrocarbonaceous fuel to reform the fuel to a high quality fuel gas.

As illustrated in FIGS. 15 and 16, the steam generator 8 has a heating furnace body 88, a four-way valve 95 and switching control valves 85, 86, 87. The body 88 is provided with a pair of honey-comb type regenerators 81, combustion chambers 82, a combustion air delivery port 83 and a fuel nozzle 84. Air and fuel of a combustion air supply passage SA and a fuel supply passage SF are alternately fed to either of the chambers 82 through the port 83 and the nozzle 84 under control of the valves 85, 86, and steam of a steam supply passage LS is alternately fed to either of the regenerators 81 under control of the valve 95. High-temperature combustion gas produced in the chamber 82 is exhausted through an exhaust passages EA, EG after heating the regenerator 81. The steam at a relatively low temperature is fed through a distribution passage L1 or L2 to the regenerator 81 at a high temperature so as to be heated up to a temperature equal to or higher than 800 deg. C. by heat-transfer contact with the regenerator 81 and then, the steam flows into the supply passage HS to be fed to the change-over means 20 (FIG. 14). If desired, the valve 87 is opened so that a part or all of the combustion gas of an exhaust gas circulation passage R3 is introduced into the passage LS through a combustion gas passage EB for mixing the combustion gas in the steam flow of the passage LS.

With reference to FIGS. 17 to 26, preferred examples of the present invention is described hereinafter, in which constituents substantially the same as those shown in FIGS. 1 to 16 or equivalent thereto are indicated by the same reference numerals.

Figure 17:
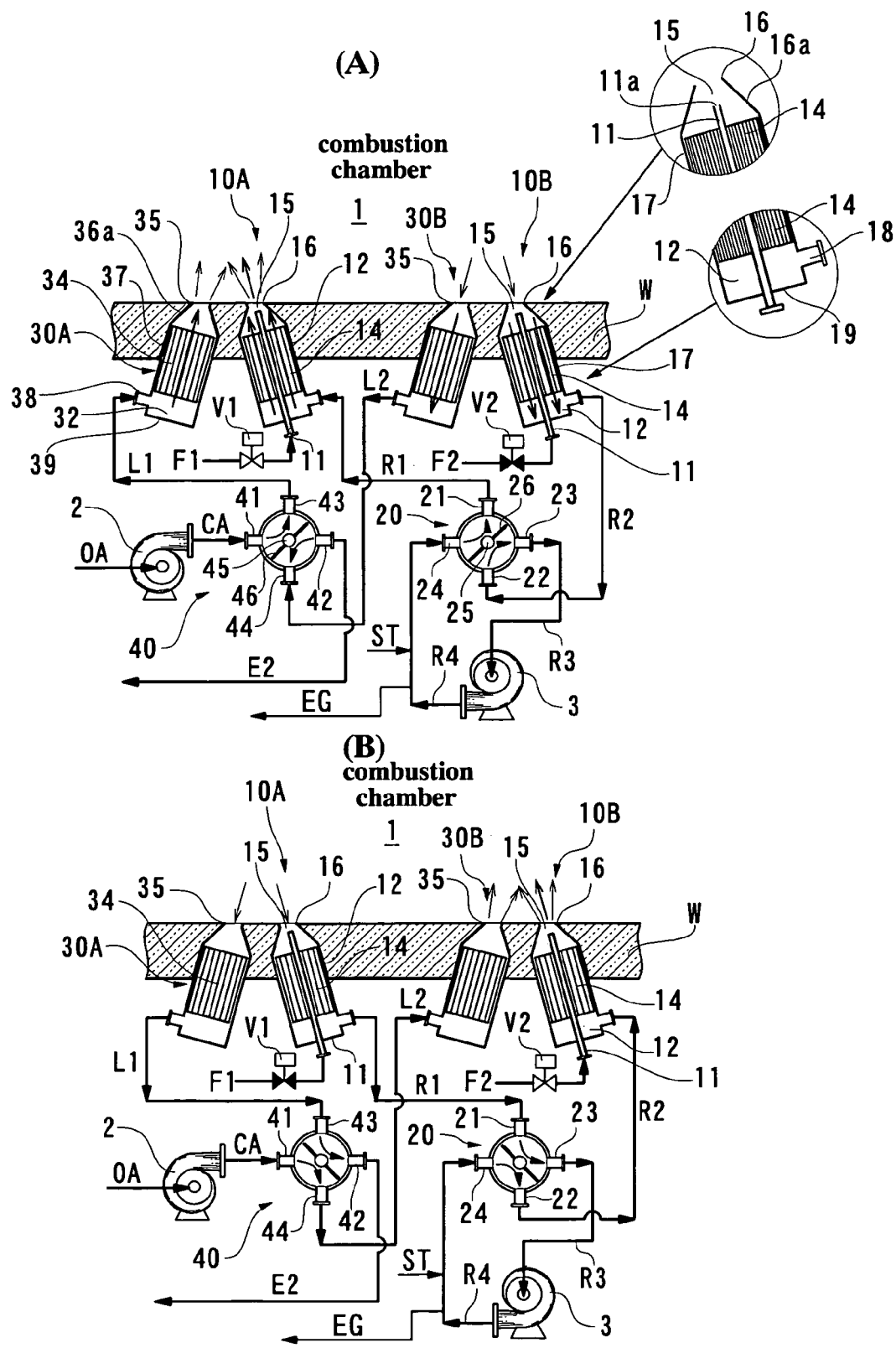
FIGS. 17 to 22 are cross-sectional views illustrating first through sixth examples of the fuel feeding apparatus and combustion system according to the present invention.

FIG. 17 is a cross-sectional view showing a combustion system with a fuel feeding device of a first example according to the present invention. FIG. 17 (A) shows a first combustion step of the combustion system and FIG. 17(B) shows a second combustion step thereof.

The system shown in FIG. 17 has a further embodied arrangement with respect to the embodiment shown in FIG. 6, which includes air supply devices 30A, 30B, passage change-over means 40 and an air supply fan 2, and which has fuel mixing devices 10A, 10B, passage change-over means 20 and an exhaust gas circulation fan 3 constituting a fuel feeding apparatus. The change-over means 20, 40 is alternately switched to a first position (FIG. 17A) and a second position (FIG. 17B). The fuel mixing devices 10A, 10B and the air supply devices 30A, 30B are fixed on a furnace body W of a combustion chamber 1 at a predetermined angle. Center axes of the devices 10A, 30A are oriented to intersect each other in a combustion area of the chamber 1, and center axes of the devices 10B, 30B are oriented to intersect each other therein.

The fuel mixing devices 10A, 10B are generally constructed by a cylindrical casing 17, a regenerator 14 contained in the casing 17 and a fuel nozzle 11 extending through the regenerator 14. A top portion of the casing 17 has a truncated-conic (frustoconical) reducing part 16a and a fuel gas injection port 16 opens at a top face of the part 16a. A fuel injection port 11a of the nozzle 11 is located at a position backward from the port 16, so that a mixing area 15 is defined between the ports 16 and 1a. A bottom of the casing 17 is blocked by a bottom plate 19 and a combustion gas introduction part 12 is defined between the regenerator 14 and the plate 19. The introduction part 12 is in communication with a fuel gas port 18 which is connected with a exhaust gas circulation passage R1, R2. The fuel nozzle 11 extends through the plate 19 to be connected with a fuel supply pipe F1,F2, and fuel supply control valves V1,V2 are provided on the pipes F1, F2 respectively.

Each of the air supply devices 30A, 30B is constructed by a cylindrical casing 37 and a regenerator 34 contained in the casing 37. A top portion of the casing 37 has a truncated-conic (frustoconical) reducing part 36a and a combustion air delivery port 35 opens at a top face of the part 36a. A bottom of the casing 37 is blocked by a bottom plate 39 and a combustion air introduction part 32 is defined between the regenerator 34 and the plate 39. The introduction part 32 is in communication with a combustion air port 38 which is connected with passages L1, L2.

The regenerator 14, 34 is a ceramic honey-comb structure of a lattice formation with a large number of cell apertures having a square cross-section. The honey-comb structure has the cross-sectional dimensions and length adapted for incorporation in the casing 17, 37 and each of the cell apertures defines a narrow fluid passage for flow of the combustion gas or combustion air. The cell wall thickness and the pitch of the cell walls are preferably set to be the thickness and pitch which correspond to a maximum volumetric efficiency of the regenerator and ensure the temperature effectiveness in a range of 0.7~1.0.

The passage change-over means 20 is defined by a high-speed switching type of four-way valve which can be selectively switched to a first or second position, and is provided with a plate-like valve body 26 secured on a rotational center shaft 25. The change-over means 20 has ports 21,22 connected with the exhaust gas circulation passages R1, R2, and bypass ports 23,24 connected with exhaust gas circulation passages R3, R4. The passage R3 is connected with a suction port of the fan 3 and the passage R4 is connected with a delivery port of the fan 3. An exhaust gas passage EG and a steam supply passage ST are connected to the passage R4. If desired, a part of combustion gas is exhausted from the system and steam of a steam generator (not shown) is injected into the combustion gas flow of the passage R4.

The change-over means 40 is a high speed switching type of four-way valve controllable to be switched to a first or second position simultaneously with the change-over means 20, and the means 40 is provided with a plate-like valve body 46 fixed on a rotatable center shaft 45. The means 40 has an air supply port 41 connected with a combustion air supply passage CA, an exhaust gas port 42 connected with an exhaust gas passage E2, and ports 43, 44 connected with the passages L1, L2 respectively.

In the first combustion step (FIG. 17A), the change-over means 20, 40 is held in a first position. The combustion gas of the combustion chamber 1 is sucked through the regenerator 14 of the device 10B by the fan 3. The combustion gas is pressed by the fan 3 and if desired, a quantity of steam of the passage ST is added to the combustion gas, and thereafter, the gas is delivered to the mixing area 15 through the regenerator 14 of the device 10A. The valve V1 feeds the fuel to the nozzle 11 of the device 10A, so that the fuel is delivered to the mixing area 15 of the device 10A. The fuel and combustion gas (and steam) are mixed with each other, so that the mixed gas flows into the combustion chamber 1 through the port 16 as a fuel gas. The combustion gas in the chamber 1 is also extracted through the regenerator of the device 30B to the passage L2, and the gas is exhausted from the system through the change-over means 40 and the passage E2 under exhaust gas induction pressure of an exhaust fan (not shown). The fan 2 introduces the combustion air into the regenerator 34 of the device 30A through the passages CA, L1 and the change-over means 40. The combustion air through the regenerator 34 flows into the combustion chamber 1 through the port 35. The fuel gas flow and the combustion air flow delivered from the devices 10A, 30A mix with each other in the combustion chamber 1 and the fuel gas burns.

In the second combustion step (FIG. 17B), the change-over means 20, 40 is held in a second position. The combustion gas of the combustion chamber 1 is sucked through the regenerator 14 of the device 10A by the fan 3. The combustion gas is pressed by the fan 3 and if desired, a quantity of steam of the passage ST is added to the combustion gas, and thereafter, the gas is delivered to the mixing area 15 through the regenerator 14 of the device 10B. The valve V2 feeds the fuel to the nozzle 11 of the device 10B, so that the fuel is delivered to the mixing area 15 of the device 10B. The fuel and combustion gas (and steam) are mixed with each other, so that the mixed gas flows into the combustion chamber 1 through the port 16 as a fuel gas. The combustion gas in the chamber 1 is also extracted through the regenerator of the device 30A to the passage L1, and the gas is exhausted from the system through the change-over means 40 and the passage E2 under the pressure of the exhaust fan (not shown). The fan 2 introduces the combustion air into the regenerator 34 of the device 30B through the passages CA, L2 and the change-over means 40. The combustion air through the regenerator 34 flows into the combustion chamber 1 through the port 35. The fuel gas flow and the combustion air flow delivered from the devices 10A, 30A mix with each other in the combustion chamber 1 and the fuel gas burns.

The change-over means 20, 40 is alternately switched to either of first and second positions in a predetermined time interval set to be no longer than 60 seconds, so that the first step (FIG. 17A) and the second step (FIG. 17B) are alternately carried out. The regenerator 14 of each of the fuel mixing devices 10A, 10B repeatedly takes either of a heat accumulating action for cooling the high-temperature combustion gas by heat-transfer contact therewith and a heat emission action for heating the cooled combustion gas up to an extremely high-temperature range by heat-transfer contact therewith. Therefore, the temperature of the gas through the passage R3, R4 is lowered to relieve the heat load and thermal stress of the fan 3 and the combustion gas (and steam) to be delivered to the mixing area 15 is reheated to the temperature slightly lower than the temperature immediately after its extraction. The regenerator 34 of each of the devices 30A, 30B repeatedly takes either of a heat accumulating action for cooling the high-temperature combustion gas by heat-transfer contact therewith and a heat emission action for heating the low-temperature combustion air up to an extremely high-temperature range by heat-transfer contact with the air. Thus, the sensible heat of the combustion exhaust gas is transmitted to the combustion air by means of the regenerator and the combustion air to be delivered from the port 35 is continuously pre-heated to the extremely high-temperature range.

As described above, the injection flows of high-temperature combustion air and mixed gas are injected from the ports 16, 35 to the combustion area, so that the flows are mixed in an intersecting region of the center axes of the devices 10, 30 to form a high-temperature combustion atmosphere of a low oxygen density in the intersecting region. The port 16,35 is restricted in its cross-sectional area of flow passage, and the velocity of flow of the fuel gas and that of the combustion gas at the ports 16,35 are set to be a high value, e.g., greater than 10 m/s, so that high speed flows of the fuel gas and combustion air enters into the combustion chamber 1. The fuel gas flow, which has a flow rate approximately equivalent to the flow rate of the combustion air, has a momentum approximately equivalent to a momentum of the combustion air. This enables to carry out control of fuel gas flow, independently of the combustion air flow.

That is, according to a conventional method of diluting a fuel with an in-furnace recirculation gas flow, a fuel is mixed with combustion gas by mixing a fuel injection flow with an in-furnace combustion gas flow, whereas, according to the present invention, the fuel injected from the fuel injection port 1a is mixed with the high-temperature combustion gas (and steam) fed from an end of the regenerator 14 facing to the in-furnace area, so as to enter from the mixing area 15 into the furnace as being the mixed gas flow (fuel gas injection flow) including a large quantity of high-temperature combustion gas (and steam). As the fuel has been already mixed with the high-temperature combustion gas before entering the furnace, mixing thereof with an in-furnace combustion gas flow is unnecessary. Further, the fuel gas injection flow to be introduced into the furnace has a momentum enough to be substantially independent of the in-furnace combustion gas recirculation flow, so that the fuel gas effects an impingement mixing with the combustion air flow and slowly takes a combustion reaction. According to such a fuel feeding method, it is possible to optionally control the position and region for mixing the fuel gas flow and the combustion air flow, independently of the in-furnace combustion gas recirculation flow.

Further, as the fuel and the combustion gas is mixed in the mixing area 15, the mixing process and mixing ratio of the fuel and the combustion gas (and steam) can be optionally set, and control thereof can be surely carried out. In addition, as the fuel gas flow has an enough momentum, the gas can be mixed with the combustion air flow at a desired position in the furnace. Thus, the mixing process and mixing ratio of the fuel, combustion gas (and steam) and combustion air can be surely controlled in accordance with the aforesaid arrangement.

Furthermore, since the combustion gas has a relatively large quantity of steam injected thereto, and the gas is heated and then mixed with the fuel. Therefore, the fuel is reformed by a reforming action of the high-temperature steam contained in the combustion gas so as to be a relatively high or good quality fuel. The high-temperature combustion gas and steam also function as a high-temperature heat medium or heat source for supplying to the mixing area 15 a quantity of sensible heat required for the steam reforming reaction of hydrocarbonaceous fuel (endothermic reaction).

Additionally, such a combustion method with use of a large quantity of fuel gas flow entirely differs from the conventional combustion method as described hereinbelow.

The high-temperature combustion gas (and steam) at a low oxygen density functions as a high-temperature fuel carrier or means for increasing the fuel volume, which restricts a combustion reaction of the fuel and greatly increase the momentum of the fuel. On the other hand, the high-temperature combustion air acts as an oxidizing agent causing a slow combustion reaction of the fuel gas by its self ignition in a combustion atmosphere of low oxygen density. Increased momentum of the fuel fluid diminishes affection of buoyancy involved in temperature differences in the furnace, and prevents incomplete combustion and local heat resulting from its uneven and local mixing with the combustion air. As the fuel fluid with an independently controllable momentum is not so influenced by an in-furnace circulation flow of the combustion gas, the position, condition and speed of mixing the fuel fluid with combustion air can be controlled by control of the fuel gas, whereby the position and characteristics of flame can be desirably controlled.

Further, in the conventional high-cycle regenerative combustion system, the injected fuel flow from its delivery port is apt to shortly pass to a combustion exhaust gas port owing to an adjacent layout of the exhaust gas port and a delivery port of combustion air and fuel on a furnace wall, and vibration of in-furnace circulation flow and so forth is apt to be generated by a repeated switching operation of air supply and exhaust in a short time interval, so that vibration of injected fuel flow or vibration of mixed gas of fuel and air tends to be caused. This kind of fluid vibration may cause a thick and thin fuel condition, pulsating combustion and unstable combustion reaction in the combustion atmosphere, and therefore, an approach for surely avoiding such conditions is desired. On the contrary, the combustion system of the arrangement as set forth above is capable of appropriately and surely mixing the fuel and combustion air in the combustion area and effecting a stable combustion therein, owing to increase of momentum of fuel fluid, whereby the aforementioned short pass of fuel, vibration of mixed gas and so forth can be prevented from occurring.

Figure 18:
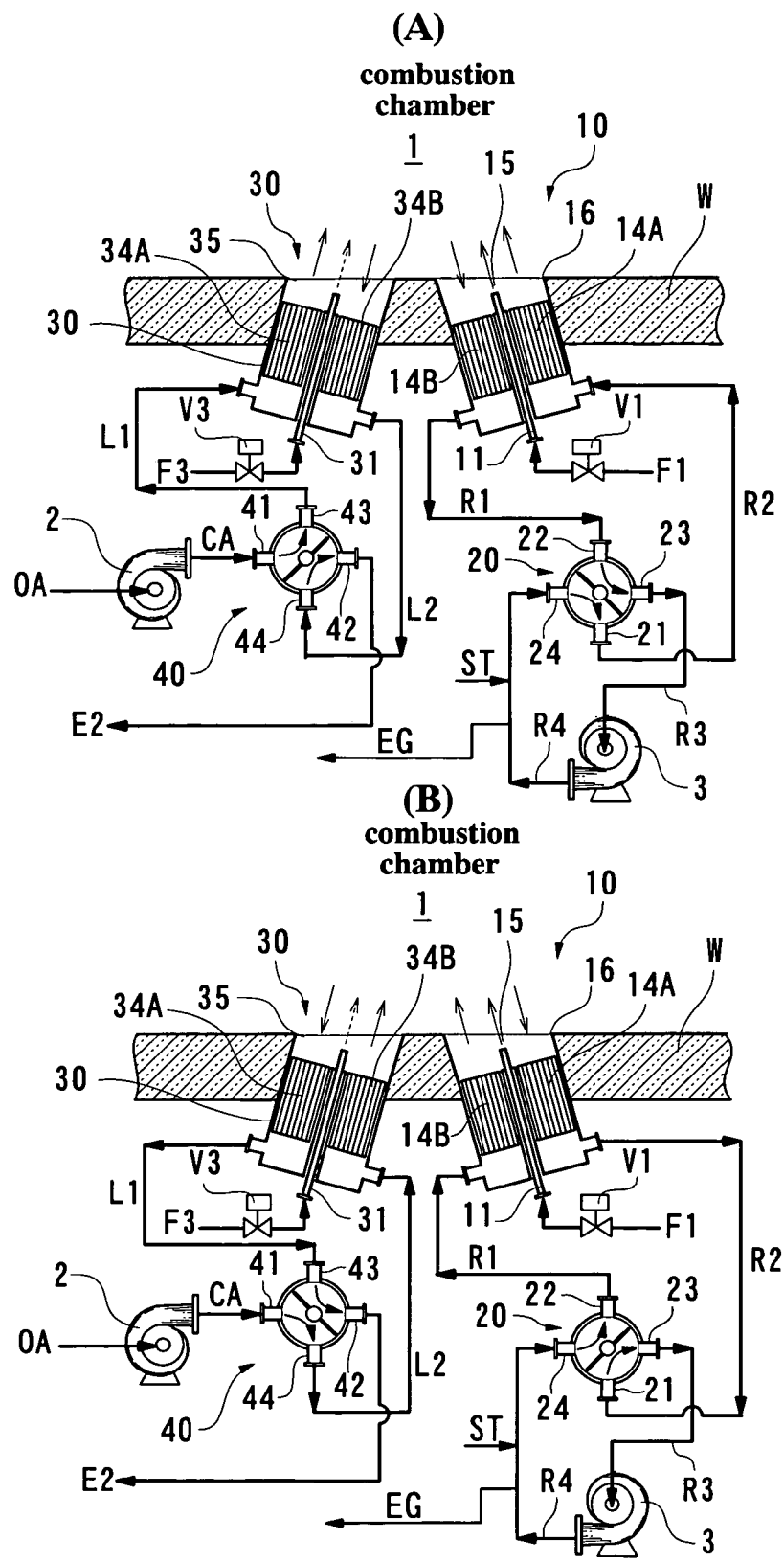

FIG. 18 is a cross-sectional view showing a combustion apparatus with a fuel feeding device of a second example according to the present invention. FIG. 18 (A) shows a first combustion step of the combustion apparatus and FIG. 18(B) shows a second combustion step thereof.

The apparatus shown in FIG. 18 is provided with passage change-over means 20, 40, an air supply fan 2 and an exhaust gas circulation fan 3 which have substantially the same arrangements as those of the first example as set forth above. The change-over means 20, 40 is alternately switched to a first position (FIG. 18A) and a second position (FIG. 18B) in a predetermined interval of time. In the present example, the fuel mixing device 10 has an integrally combined structure of the fuel mixing devices 10A, 10B of the first example as described above, and the air supply devices 30 has an integrally combined structure of the air supply devices 30A, 30B of the first example.

The fuel mixing device 10 has a pair of regenerators 14A, 14B. In a first combustion step (FIG. 18A), combustion gas of the combustion chamber 1 is extracted from the furnace through the second regenerator 14B, and pressed by the exhaust gas circulation fan 3, and if desired, a quantity of steam is added to the combustion gas. The combustion gas (and steam) is delivered through the first regenerator 14A into a mixing area 15 and mixed with a fuel injected from a fuel nozzle 11, and the gas flows into the chamber 1 as being a fuel gas. In a second combustion step (FIG. 18B), the combustion gas of the combustion chamber 1 is extracted from the furnace through the regenerator 14A, and pressed by the fan 3, and if desired, a quantity of steam is added to the combustion gas. The combustion gas (and steam) is delivered through the second regenerator 14B into the mixing area 15 and mixed with the fuel injected from the fuel nozzle 11, and the gas flows into the chamber 1 as being the fuel gas. The change-over means 20 is controlled to be alternately switched to either of first and second positions, and the regenerator 14A, 14B repeatedly takes a heat accumulating action and a heat emission action. A fuel supply control valve V1 on a fuel supply pipe F1 normally feeds the fuel to the nozzle 11. The fuel is normally delivered to the mixing area 15 and mixed with the high-temperature combustion gas (and steam) delivered from either of the regenerators 14A, 14B, so that the mixed gas (fuel gas) is continuously produced.

Similarly, the air supply device 30 has a pair of regenerators 34A, 34B and a fuel nozzle 31 positioned between the regenerators 34A and 34B. In the first combustion step (FIG. 18A), the combustion gas of the combustion chamber 1 is extracted from the furnace through the second regenerator 34B, and exhausted through an exhaust passage E2. The combustion air is introduced into the combustion chamber 1 through the first regenerator 34A under the forced draft pressure of the fan 2. In the second combustion step (FIG. 18B), the combustion gas of the combustion chamber 1 is extracted from the furnace through the first regenerator 34A, and exhausted through an exhaust passage E2. The combustion air is introduced into the combustion chamber 1 through the second regenerator 34B under the forced draft pressure of the fan 2. The change-over means 40 is controlled to be alternately switched to either of first and second positions simultaneously with the change-over means 20, and the regenerator 34A, 34B repeatedly takes a heat accumulating action and a heat emission action. The fuel nozzle 31 is connected with a fuel supply pipe F3 with a fuel supply control valve V3. The nozzle 31 feeds a fuel only in a period (cold period) in which the furnace temperature is relatively low, e.g., in a starting period of the combustion system. A fuel injection port positioned at a front end of the nozzle 31 injects the fuel to cause in a combustion area, a combustion reaction with the combustion air containing a relatively large quantity of oxygen. The fuel nozzle 31 stops the fuel injection in a period (hot period) in which the furnace temperature rises up to a predetermined temperature.

The device 10, 30 is fixed on a furnace body W of the chamber 1 at a predetermined angle, and center axes of the devices 10, 30 are directed to intersect each other in the combustion area of the chamber 1. The combustion air flowing into the chamber 1 from the air supply device 30 mixes with the mixed gas (fuel gas) flowing into the chamber 1 from the fuel mixing device 10 so as to take a combustion reaction.

According to such a combustion apparatus, controllability of mixing process and mixing ratio of fuel, combustion gas (and steam) and combustion air is improved similarly to the aforementioned example, and also, the fuel can be continuously injected from the fuel nozzle 11 without switching control of fuel injection timing of the nozzle 11. The fuel nozzle 31 may inject the fuel during the hot period, and in such a case, the fuel injection quantity may be reduced in the hot period.

Figure 19:
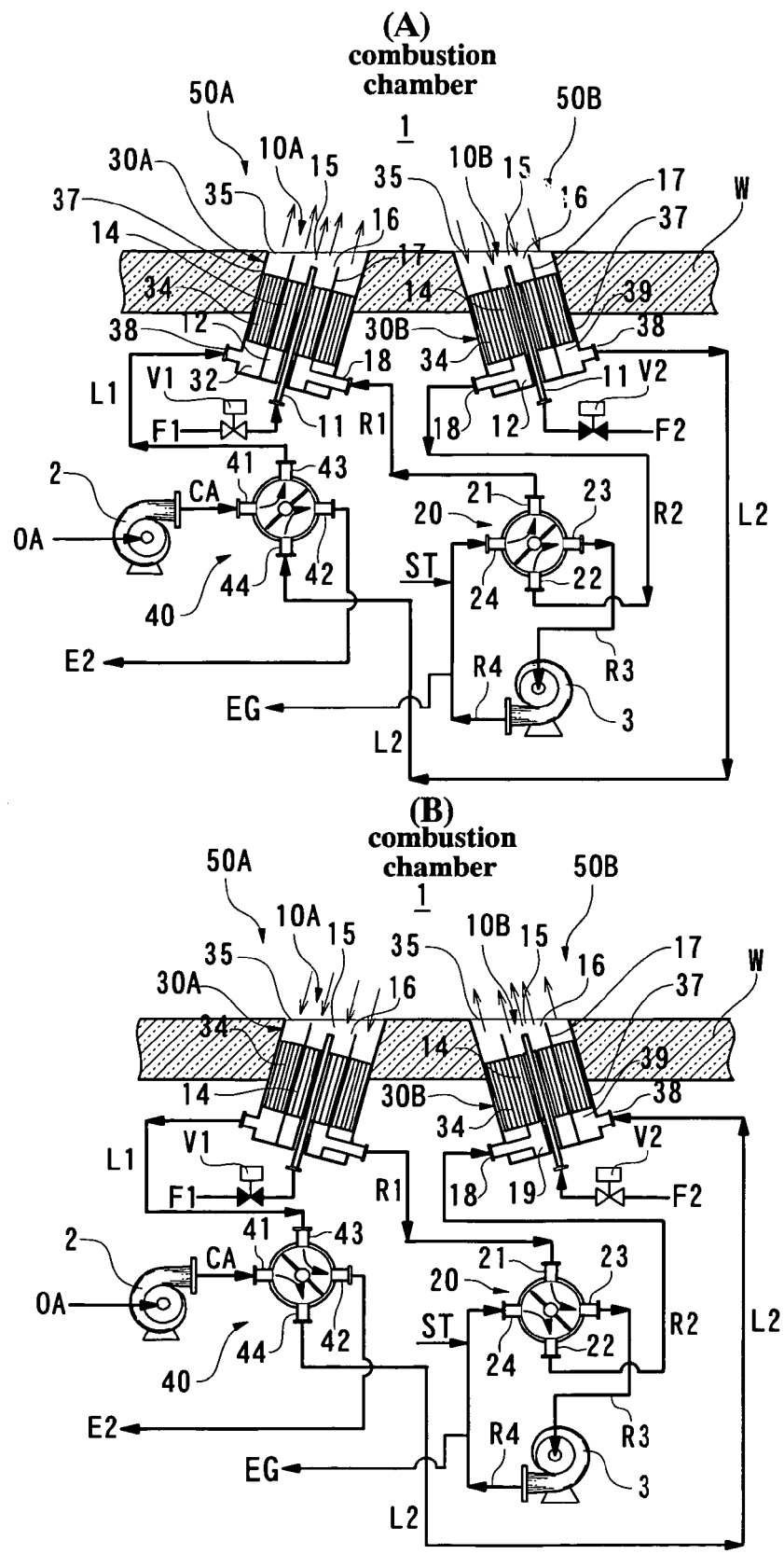

FIG. 19 is a cross-sectional view showing a combustion system with a fuel feeding device of a third example according to the present invention. FIG. 19 (A) shows a first combustion step of the combustion system and FIG. 19(B) shows a second combustion step thereof.

The apparatus shown in FIG. 19 is provided with passage change-over means 20, 40, an air supply fan 2 and an exhaust gas circulation fan 3 which have substantially the same arrangements as those of the first and second examples as set forth above. The change-over means 20, 40 is alternately switched to a first position (FIG. 19A) and a second position (FIG. 19B) in a predetermined interval of time. Each of fuel injection nozzles 11 is controlled synchronously with the change-over means 20, 40 to alternately inject a fuel.

In the present example, the fuel supply device comprises a fuel mixing device 10A incorporated in a combined combustion device 50A, and a fuel mixing device 10B incorporated in a combined combustion device 50B. This arrangement of the fuel supply device further embodies the embodiment as shown in FIG. 6.

The device 10A of the combined device 50A has a fuel nozzle 11, a regenerator 14, a casing 17 and a combustion gas introduction part 12. An air supply device 30A is provided with a regenerator 34 positioned outside of the device 10A, a casing 37 and a combustion air introduction part 32. A combustion gas port 18 is connected with an exhaust gas circulation passage R1, and a combustion air port 38 is connected with a fluid passage L1. Further, the nozzle 11 is connected with a fuel supply pipe F1 with a fuel supply control valve vi.

The combined device 50B is constituted from the devices 10B, 30B which have substantially the same arrangements as those of the devices 10A, 30A, and the partial arrangements of the device 50B is symmetrical with those of the device 50A. A combustion gas port 18 of the device 50B is connected with an exhaust gas circulation passage R2, and a combustion air port 38 is connected with a fluid passage L2. Further, the nozzle 11 of the device 10B is connected with a fuel supply pipe F2 with a fuel supply control valve V2.

In a first combustion step (FIG. 19A), the combustion gas of the combustion chamber 1 is extracted to the passages R2, L2 through the regenerator 14, 34 of the combined device 50B. The combustion gas of the passage R2 is induced through the change-over means 20 by the exhaust gas circulation fan 3. The combustion gas is pressed by the fan 3 and if desired, a quantity of steam is injected into the combustion gas, and thereafter, the gas is delivered into a mixing area 15 through the regenerator 14 so as to be mixed with the fuel injected from the nozzle 11, thereby flowing into the combustion chamber 1. On the other hand, the combustion gas of the passage L2 is exhausted from the system through the change-over means 40 and an exhaust gas passage E2. The combustion air passes through the regenerator 34 of the combined device 50A to flows into the combustion chamber 1 through a delivery port 35 of the combined device 50A.

In a second combustion step (FIG. 19B), the combustion gas of the combustion chamber 1 is extracted to the passages R1, L1 through the regenerator 14, 34 of the combined device 50A. The combustion gas of the passage R1 is induced through the change-over means 20 by the fan 3. The combustion gas is pressed by the fan 3 and if desired, a quantity of steam is injected into the combustion gas, and thereafter, the gas is delivered into the mixing area 15 through the regenerator 14 of the device 50B so as to be mixed with the fuel injected from the nozzle 11, thereby flowing into the combustion chamber 1. On the other hand, the combustion gas of the passage L1 is exhausted from the system through the change-over means 40 and the passage E2. The combustion air passes through the regenerator 34 of the combined device 50B to flows into the combustion chamber 1 through the delivery port 35 of the combined device 50B.

The change-over means 20, 40 is controlled to be synchronously switched to either of first and second positions in a predetermined interval of time set to be no longer than 60 seconds, and the regenerator 14, 34 repeatedly takes a heat accumulating action and a heat emission action. The fuel gas flow and the combustion air flow delivered from the devices 50A, 50B are mixed in the combustion area in the combustion chamber 1 to take a combustion reaction.

According to this example, the fuel fluid of the nozzle 11 is injected into a center part of the high-temperature combustion gas flow exiting from the regenerator 14, so that the fuel is mixed with the combustion gas from the center part of the combustion gas flow. The combustion air flows out from the regenerator 34 in such a manner that the air flow surrounds the combustion gas flow, and reacts with the mixed gas (fuel gas) of the combustion gas and fuel from its peripheral zone. Therefore, the flow of combustion gas (and steam) forms an annular interference zone for surely isolating the fuel injection flow and the combustion air flow, and the fuel fluid flow reacts with the combustion air after mixed with the combustion gas (and steam), without the fuel directly reacting with the combustion air.

Figure 20:
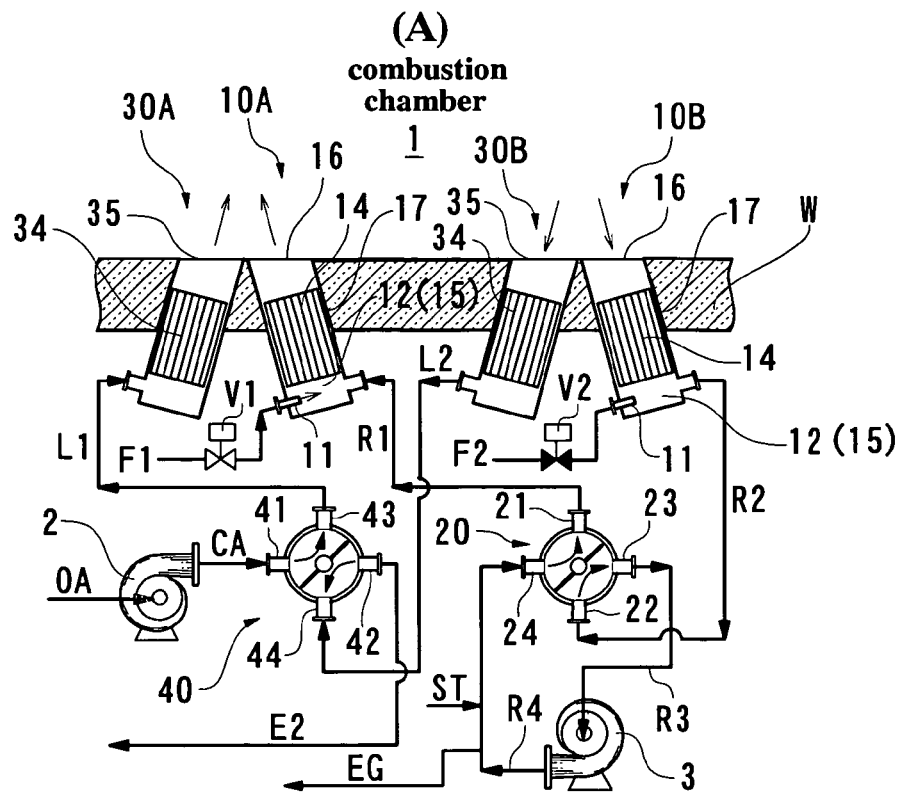
Figure 20:
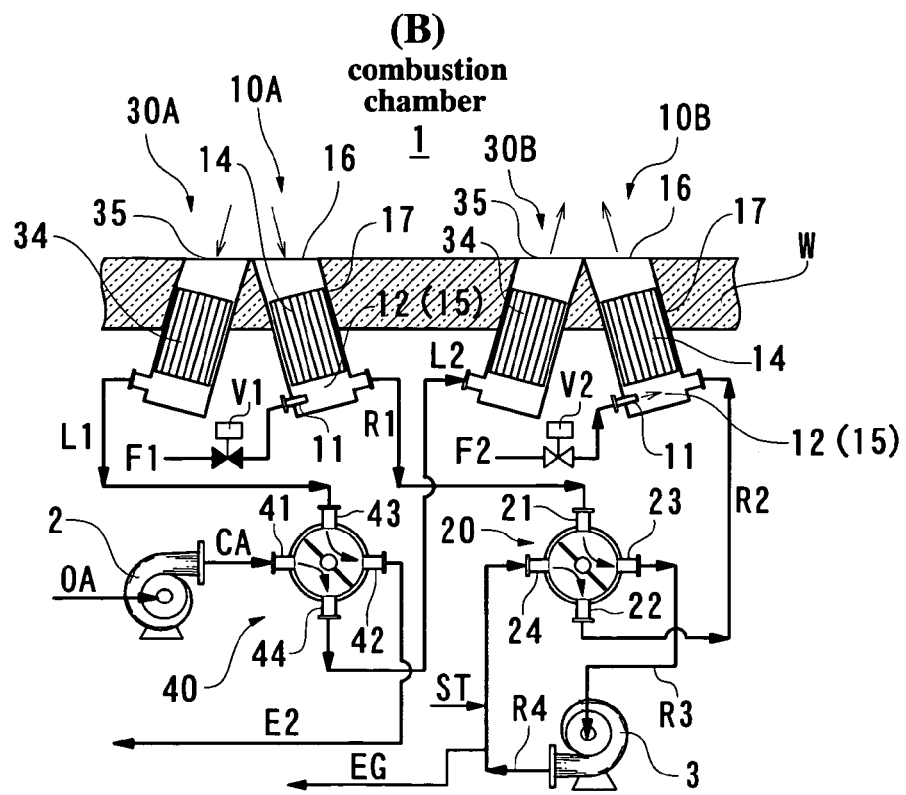

FIG. 20 is a cross-sectional view showing a combustion system with a fuel feeding device of a fourth example according to the present invention. FIG. 20 (A) shows a first combustion step of the combustion system and FIG. 20(B) shows a second combustion step thereof.

The example as shown in FIG. 20 is further embodies the embodiments as shown in FIGS. 1(C) and 8. A fuel nozzle 11 is positioned in a combustion gas introduction part 12 which functions as a mixing area 15. That is, in a first combustion step (FIG. 20A), the fuel injected by the nozzle 11 of a fuel mixing device 10A is mixed with a low-temperature combustion gas (and steam) in the mixing area 15 inside of the part 12, and the mixed gas passes through the regenerator 14 of the device 10A to be heated by the regenerator 14 at a high-temperature. On the other hand, in a second combustion step (FIG. 20B), the fuel injected by the nozzle 11 of a fuel mixing device 10B is mixed with the low-temperature combustion gas (and steam) in the mixing area 15 inside of the part 12, and the mixed gas passes through the regenerator 14 of the device 10B to be heated by the regenerator 14 at a high-temperature. In this example, a fuel injection port 16 and a combustion air port 35 do not have reduced portions, but they have relatively large cross-sectional areas. The high-temperature mixed gas and combustion air injected from the ports 16, 35 are mixed with each other in a combustion area of a combustion chamber 1 to take a combustion reaction. The other arrangements and operations are substantially the same as those of the first example as shown in FIG. 17, and therefore, further detailed explanations are omitted.

According to this example, the mixed gas gains the heat while passing through the regenerators 14 of the devices 10A, 10B to be heated up to a high-temperature, and thereafter, mixes with the high-temperature combustion air in the combustion area of the chamber 1 to generate an extensive flame in the combustion chamber 1 with the combustion atmosphere having a low oxygen density and a high-temperature.

Figure 21:
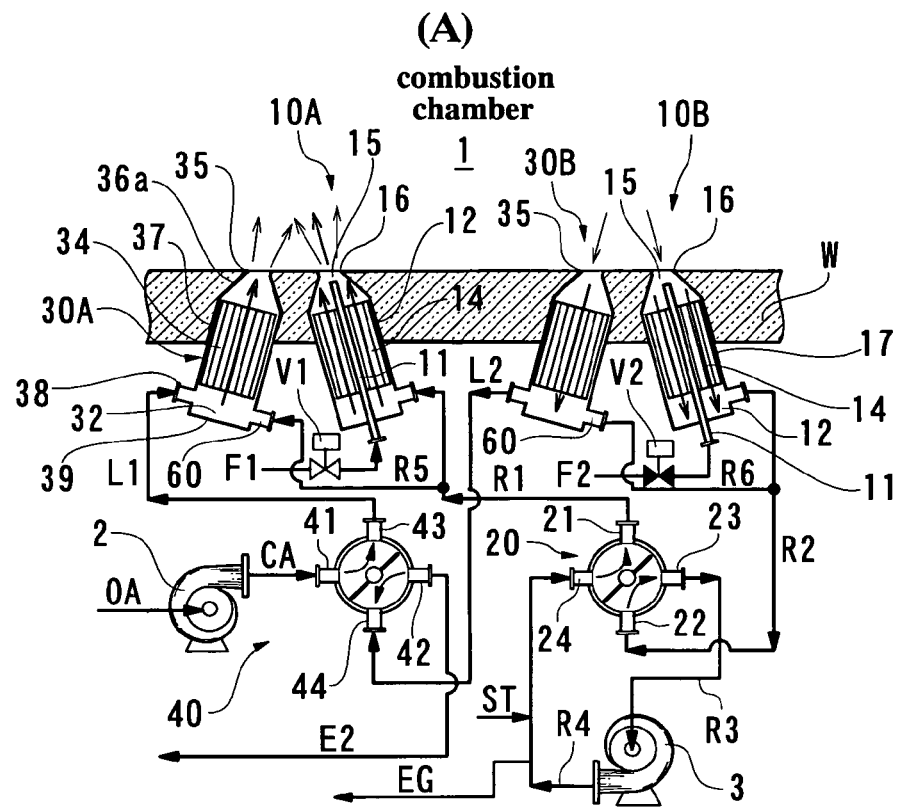
Figure 21:
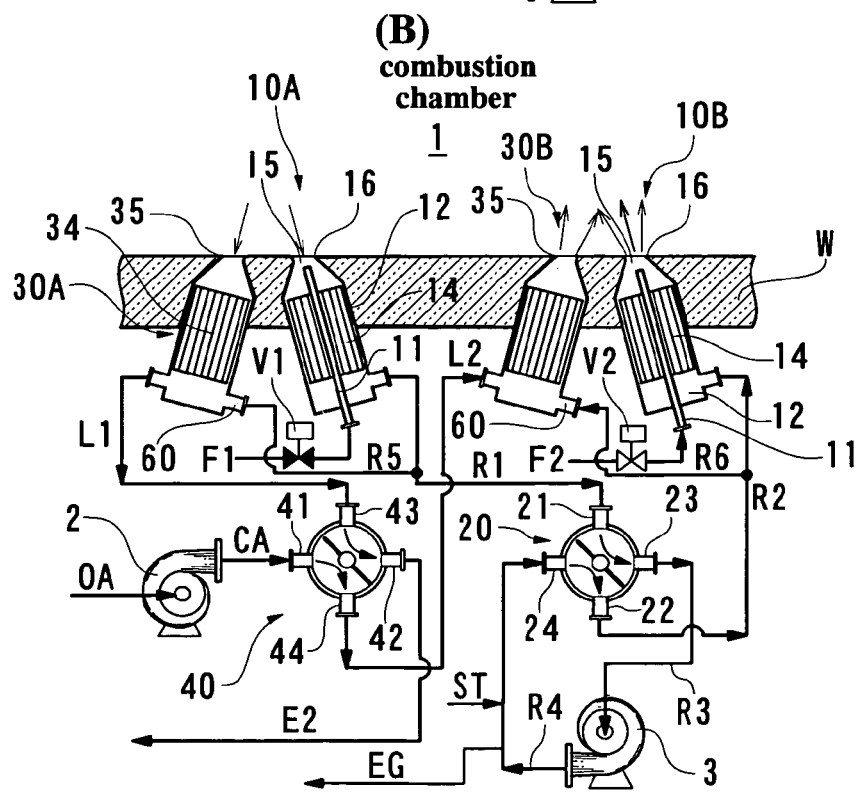

FIG. 21 is a cross-sectional view showing a combustion system with a fuel feeding device of a fifth example according to the present invention. FIG. 21 (A) shows a first combustion step of the combustion system and FIG. 21(B) shows a second combustion step thereof.

FIG. 21 shows an example which further embodies the embodiments as shown in FIGS. 2 and 10. Combustion air introduction parts 32 of air supply devices 30A, 30B are in communication with shunt passages R5, R6 of exhaust gas circulation passages R1, R2 by means of combustion gas introduction port 60. Combustion gas (and steam) introduced into the part 32 through the port 60 is mixed with combustion air, and the mixed fluid of air and combustion gas is pre-heated up to the aforementioned extremely high temperature range by the regenerator 34 and thereafter, flows into the furnace through a delivery port 35. According to such an arrangement, the combustion air, as well as the fuel, is mixed with the combustion gas (and steam) before introduction into the furnace so that the combustion reactivity of the combustion air decreases. The mixed gas of combustion gas and air is introduced into the furnace, and it impinges on and mixes with the flow of fuel gas in the in-furnace combustion area, the fuel gas being similarly diluted by combustion gas (and steam), whereby a slow combustion reaction by a low oxygen density is caused in the combustion area. The other arrangements and operations are substantially the same as those of the example as shown in FIG. 17, and therefore, further detailed explanations are omitted.

Figure 22:
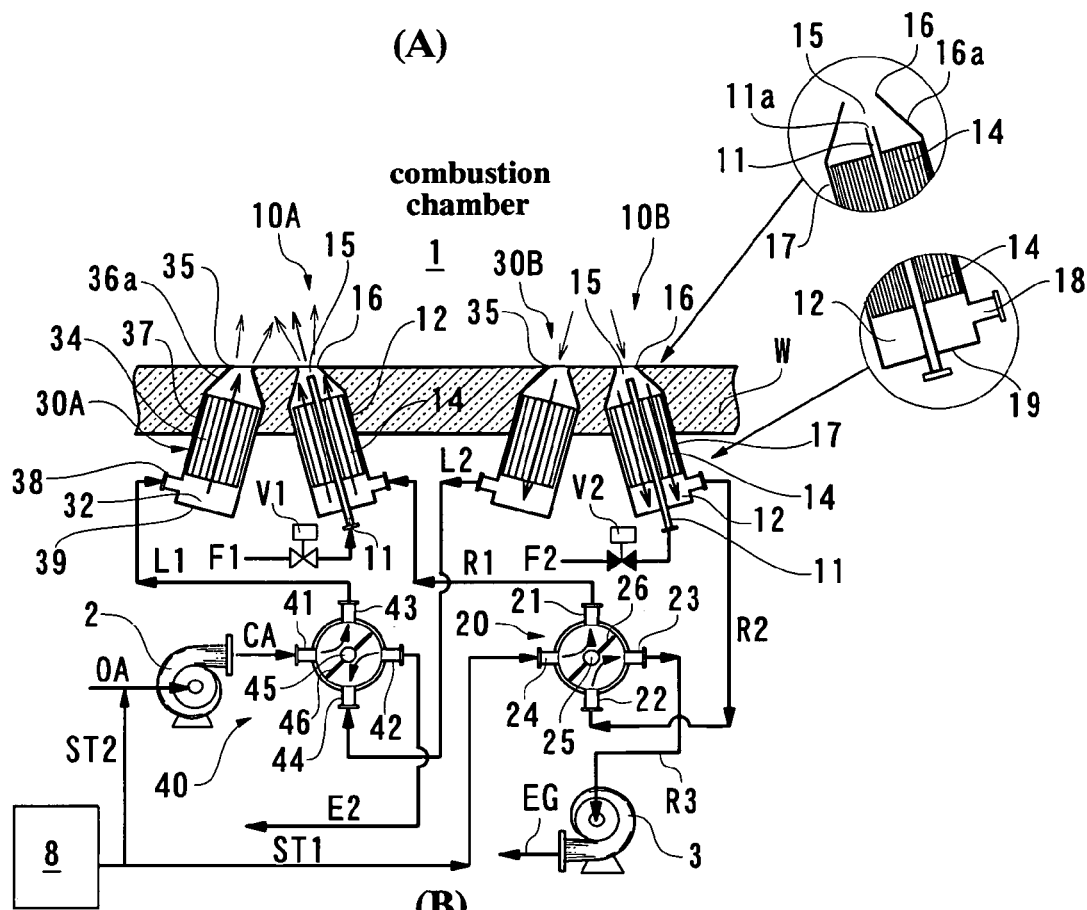
Figure 22:
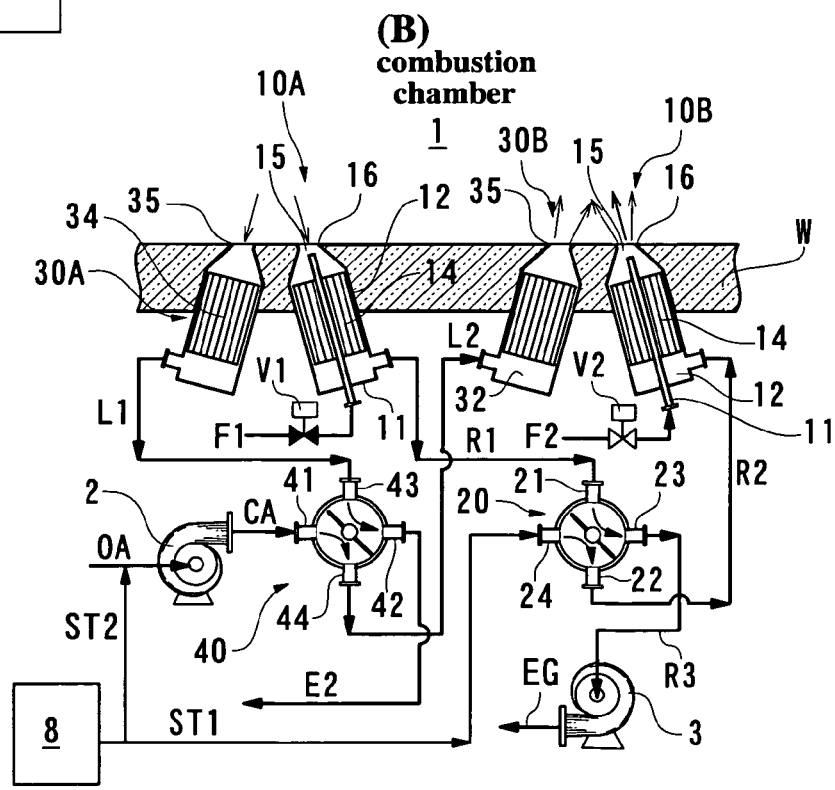

FIG. 22 is a cross-sectional view showing a combustion apparatus with a fuel feeding device of a sixth example according to the present invention. FIGS. 22(A) and 22(B) show first and second combustion steps of the combustion apparatus, respectively.

FIG. 22 shows an example which further embodies the embodiments as shown in FIGS. 2 and 10. An exhaust gas passage EG is connected to a delivery port of a circulation fan 3 and a steam supply passage ST1 of a steam generator 8 is connected to a bypass port 24 of a passage change-over means 20. The steam generator 8 is provided for an atmospheric air intake passage OA by means of a steam supply passage ST2. Steam of the generator 8 is supplied through the passages ST1:ST2 to the change-over means 20 and the passage OA, and brought into heat-transfer contact with regenerators 14, 34 to be heated up to a temperature equal to or higher than 700 deg. C. The high-temperature steam delivered to a mixing area 15 mixes with a hydrocabonaceous fuel of a fuel nozzle 11 so that the fuel is reformed to be a high quality fuel containing a relatively large quantity of hydrocarbon radical, hydrogen, carbon, carbon monoxide and so forth. According to such an arrangement, it is possible to reform a relatively heavy gravity or degraded quality hydrocabonaceous fuel such as heavy oil to a light gravity or high quality fuel. The fuel gas containing the reformed fuel is further mixed with a high-temperature air and steam flowing out from a combustion air delivery port 35 into the furnace, so that an extensive flame in a low oxygen density and high-temperature combustion atmosphere is created in the combustion chamber 1.

Figure 23:
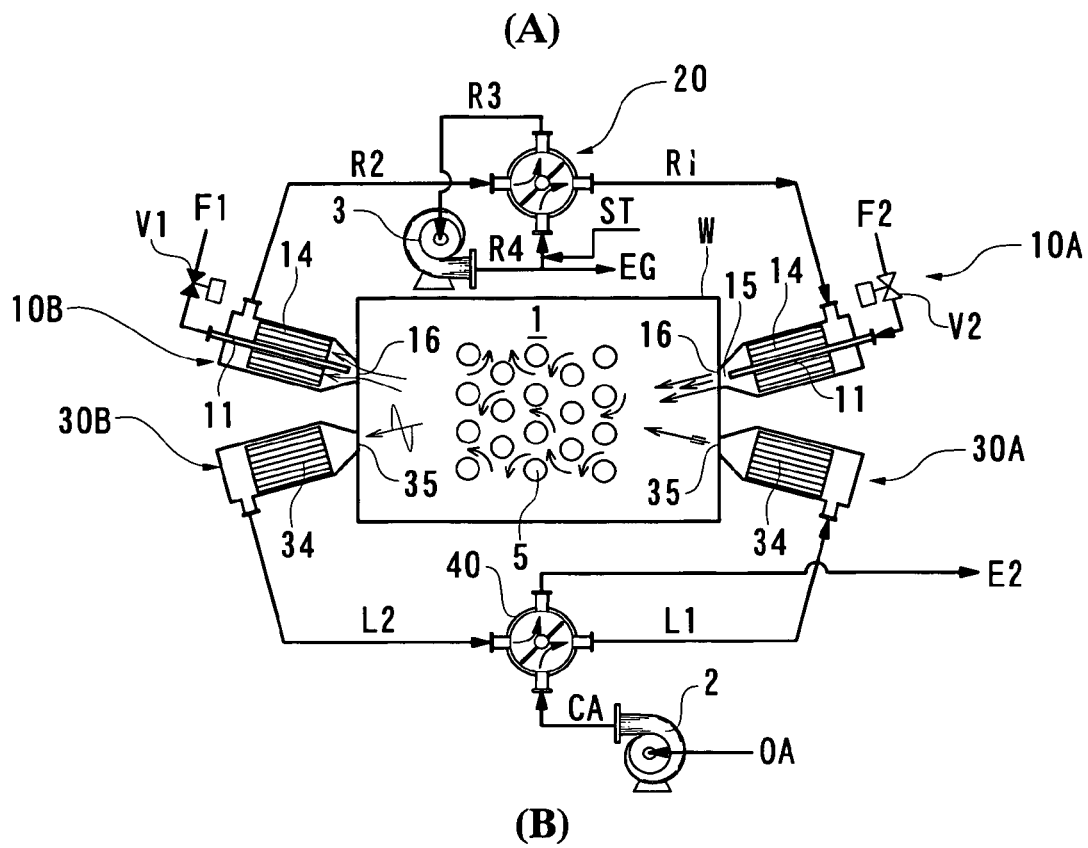
FIG. 23 is a schematic plan view of an example of heating device in accordance with the present invention.
Figure 23:
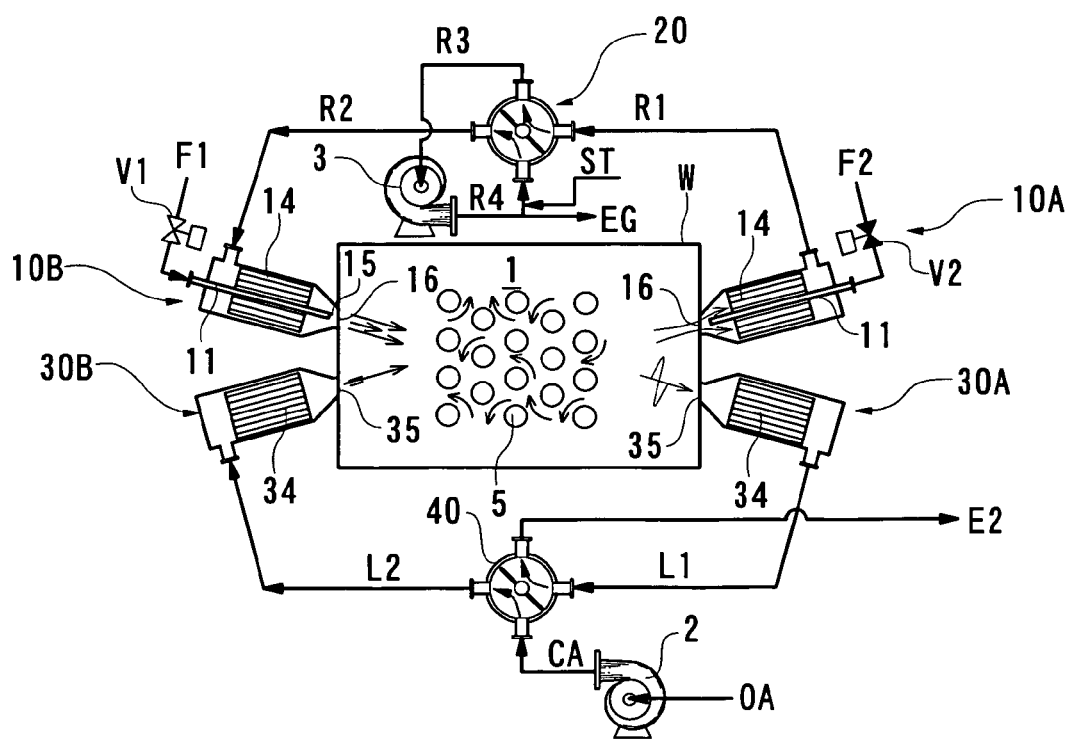

FIG. 23 is a schematic plan view showing a heating apparatus provided with the combustion system according to the present invention. FIG. 23(A) shows a first combustion step of the combustion system and FIG. 23(B) shows a second combustion step thereof.

The heating apparatus is constituted to be a tubular furnace such as a steam reforming furnace. A number of heated tubes 5, through which a fluid to be heated can pass, are arranged in a relatively overcrowded condition within a combustion chamber 1 of the heating apparatus. The tube 5 constitutes a heated segment of the heating apparatus. The combustion apparatus is provided with fuel mixing devices 10A, 10B, air supply devices 30A, 30B, change-over means 20, 40, an air supply fan 2 and an exhaust gas circulation fan 3 which have substantially the same constructions as those of the combustion apparatus illustrated in FIG. 16. The change-over means 20, 40 are alternately switched to either of a first position (FIG. 23A) and a second position (FIG. 23B).

The heating apparatus is also provided with an auxiliary combustion device (not shown), and the combustion operation of the auxiliary combustion device is carried out in a cold period in which a furnace temperature is relatively low, e.g., in a starting period of the heating apparatus. The auxiliary combustion device is rendered inoperative in a hot period in which the furnace temperature rises. The devices 10A, 10B are operated in the hot period in which the furnace temperature has been raised by operation of the auxiliary combustion device. In the first combustion step, combustion gas of the combustion chamber 1 is extracted from the furnace through regenerators 14, 34 of the devices 10B, 30B. A predetermined flow rate of combustion gas is delivered to an exhaust gas passage E2, and a predetermined flow rate of combustion gas passes through the regenerator 14 of the device 10A after addition of steam and flows into a mixing area 15 thereof, and then, it is mixed with a fuel and introduced into the chamber 1 as the fuel gas. The device 30A introduces into the chamber 1, combustion air preheated up to the extremely high temperature range by the regenerator 34. In the second combustion step, combustion gas of the combustion chamber 1 is extracted from the furnace through regenerators 14, 34 of the devices 10A, 30A. A predetermined flow rate of combustion gas is delivered to an exhaust gas passage E2, and a predetermined flow rate of combustion gas passes through the regenerator 14 of the device 10B after addition of steam and flows into a mixing area 15 thereof, and then, it is mixed with a fuel and introduced into the chamber 1 as the fuel gas. The device 30B introduces into the chamber 1, combustion air preheated up to the extremely high temperature range by the regenerator 34.

The devices 10A, 30A are directed toward a center area in the furnace in which the heated tubes 5 are arranged, and the fuel gas flow of a low oxygen density at a high-temperature and a high velocity causes an intersecting impingement mixing and a combustion reaction with a combustion air flow at a high-temperature and a high velocity in a central area of the furnace, in which the heated tubes 5 are densely arranged. Such a heating method is intended to uniformly heat the whole circumferential surface of the tube by a radiant heat-transmission effect and a convection heat-transmission effect of the flame itself. This essentially differs from the conventional heating method, i.e., the heating method in which both sides of the tube has to be heated, in dependence on the radiation heat transmission of gas and the solid radiation heat transmission of furnace wall, for uniformly heating the whole circumferential surface of the tube.

In the present example, a large volume of thin fuel gas injected by the fuel mixing device 10 intersects and impinges with a high-temperature combustion air in the center area of the furnace so as to generate a slow combustion flame due to a high-temperature combustion atmosphere at a low oxygen density. The fuel gas containing a large volume of combustion gas causes a combustion atmosphere at a low oxygen density, which restricts the combustion reaction of the fuel components, and on the other hand, the high-temperature combustion air urges self-ignition of the fuel component and enables the combustion reaction of the fuel component, even in the combustion atmosphere at a low oxygen density. As a result, the fuel gas does not entirely burns immediately after mixing with the combustion air, but the fuel component in the fuel gas causes a slow diffusion combustion in the high-temperature combustion atmosphere at the low oxygen density. Under such a combustion reaction, the flame is rendered stable and a local heat of flame is difficult to occur.

According to this heating method, it is possible to generate a flame in close vicinity of the tube 5 without causing a local overheat of the tube 5, so that the entire circumference of the tube 5 can be heated substantially uniformly. This differs from the conventional heating method in which the flame is positioned away from the tube in order to prevent a local overheat of the tube.

Further, in accordance with the arrangement of the above heating device, the flows of fuel gas and combustion air at a high velocity are rendered in an intersecting impingement with each other in the center area of the furnace in which the heated tubes 5 are densely arranged. Further, the flows induce the gas in the furnace to activate the convection thereof, and successive and irregular behavior of flame is normally caused in vicinity of the tube 5. As a result, the relatively densely arranged tubes 5 gain the heat uniformly in the entire circumference, owing to the behavior of flame and activation of in-furnace gas convection, as well as the increase of volume of flame and the uniformity of flame temperature which are caused in the low oxygen density and high temperature combustion atmosphere. Further, as the first and second combustion steps are repeatedly switched in a short interval of time, the position and characteristics of flame are also varied in a short time by the switching control of the combustion steps. That is, the temperature field and heating effect in the whole combustion area are also equalized by such a switching motion of the combustion steps.

Such a control of the flame itself permits the equalization of the radiation and convection heat transfer effects, thereby enabling an increase of density of the tubes 5. This allows the conventional type of furnace to be designed in a compacter size and enables new structural designs of a heating furnace, which is advantageous in practice.

Figure 24:
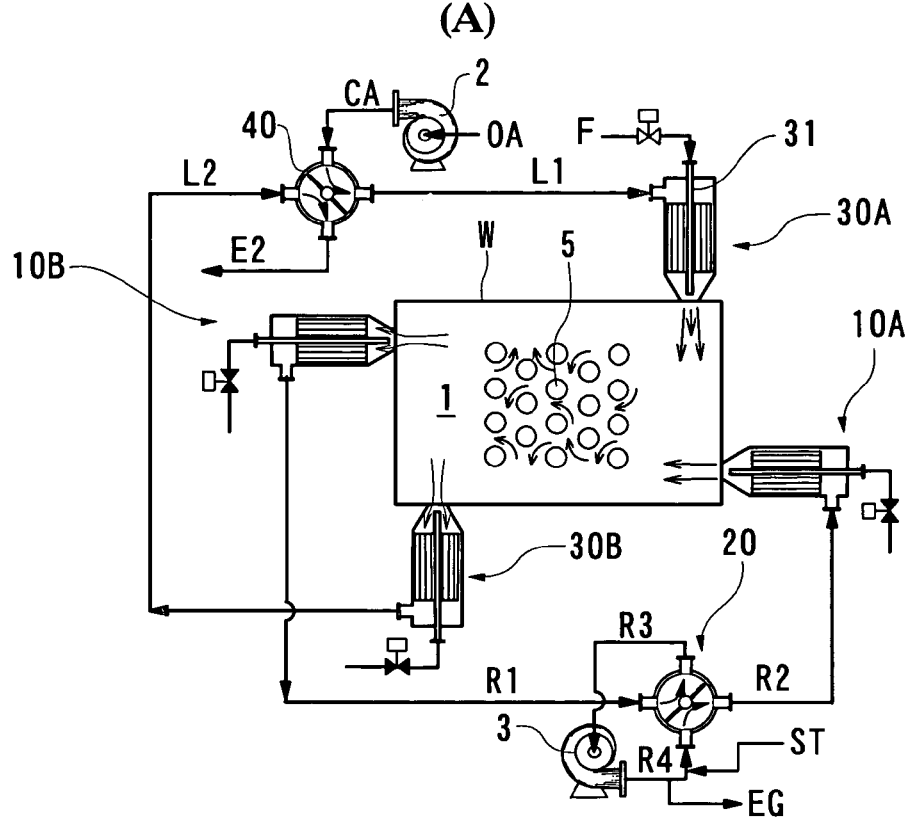
FIGS. 24 and 25 are schematic plan views illustrating alternative examples of the heating device, FIG. 24 showing an operation mode of the heating device in a cold period and FIG. 25 showing an operation mode thereof in a hot period.
Figure 24:
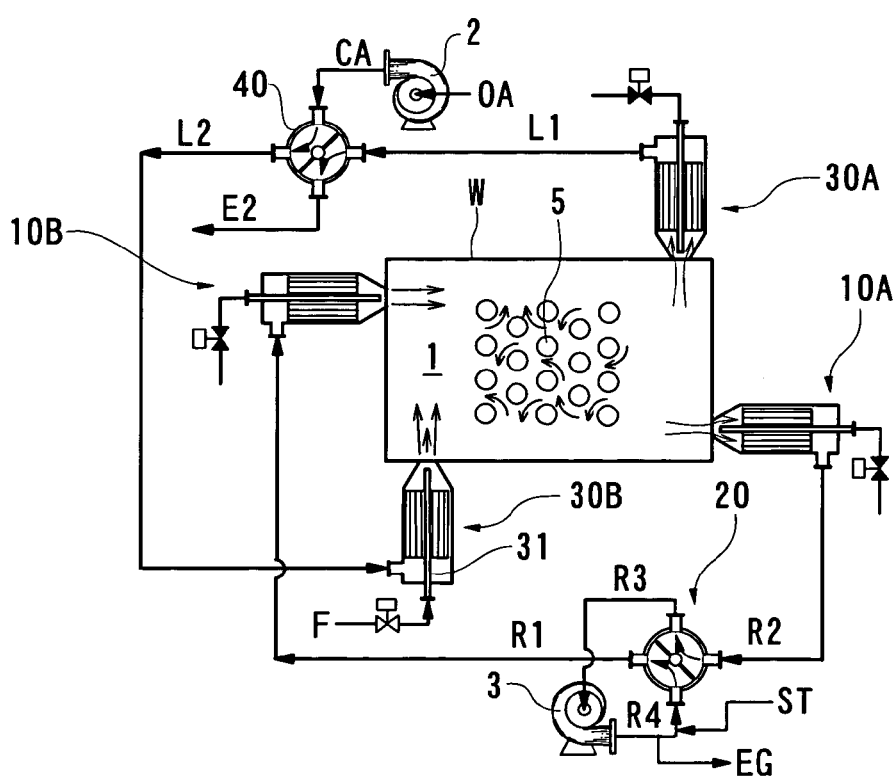
Figure 25:
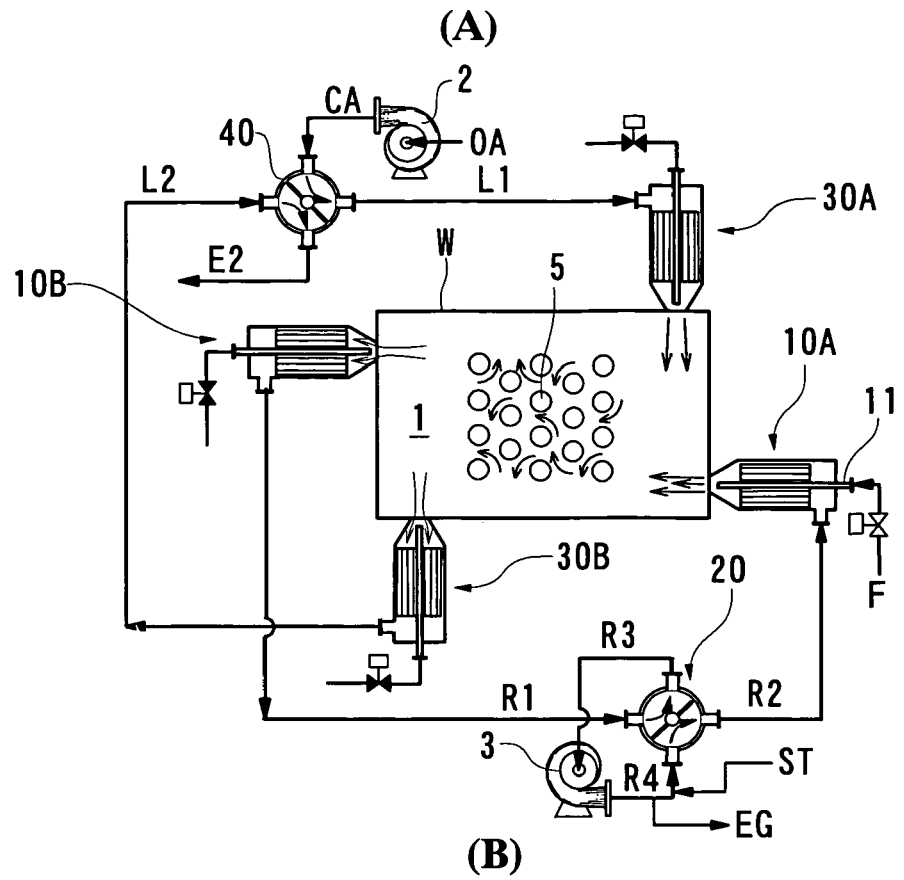
Figure 25:
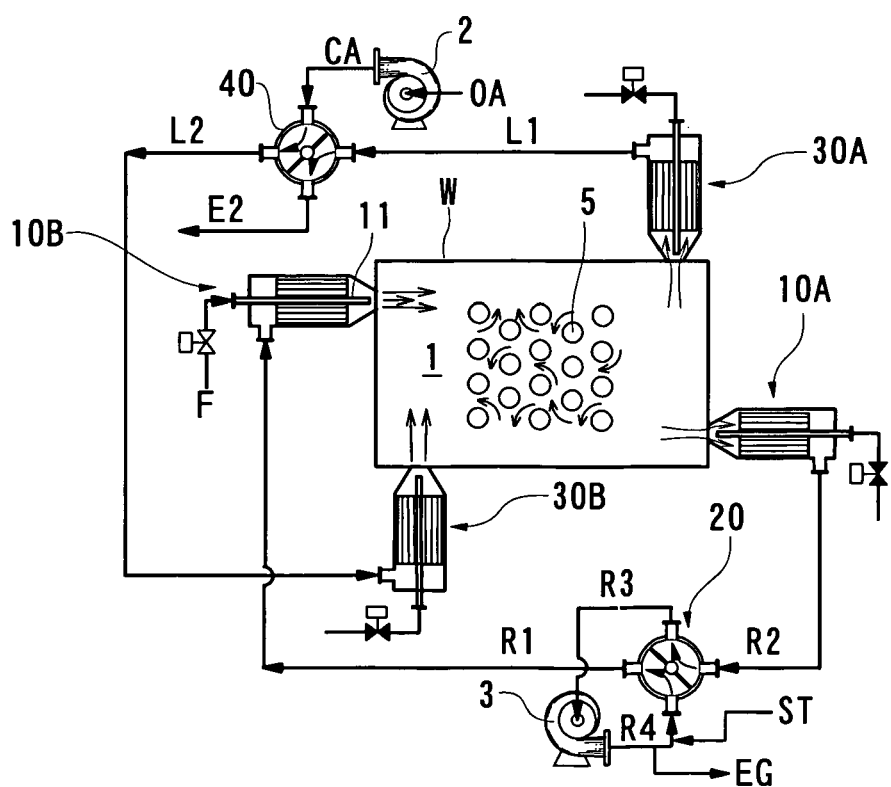

FIGS. 24 and 25 are schematic plan views showing alternative examples of the heating apparatus. An operation mode of the apparatus in a cold period is illustrated in FIG. 24 whereas an operation mode thereof in a hot period is illustrated in FIG. 25. In the respective figures, (A) shows a first combustion step of the apparatus and (B) shows a second combustion step thereof.

The heating apparatus is constituted to be a tubular furnace such as a steam reforming furnace. A number of heated tubes 5 through which a heated fluid can pass, are arranged in a relatively overcrowded condition within a combustion chamber 1 of the heating apparatus. The combustion system shown in each of FIGS. 24 and 25 has an arrangement analogous to that shown in FIG. 23. However, air heating devices 30A, 30B are provided with fuel nozzles 31 for blowing a fuel in a cold period so as to take a combustion operation in the cold period. In the operation mode during the cold period as shown in FIG. 24, the devices 30A, 30B alternately perform, in a predetermined time interval, a first combustion step (FIG. 24A) in which the fuel and combustion air are blown from the device 30A and the combustion exhaust gas is exhausted through the device 30B, and a second combustion step (FIG. 24B) in which the fuel and combustion air are blown from the device 30B and the combustion exhaust gas is exhausted through the device 30A. Fuel mixing devices 10A, 10B repeatedly carry out extraction and introduction of the combustion gas in association with the devices 30A, 30B, but the devices 10A, 10B do not delivery the fuel from nozzles 11, and therefore, the devices 10A, 10B merely function as exhaust gas recirculation means.

On the other hand, in the operation mode during the hot period as shown in FIG. 25, the fuel nozzle 31 stops fuel injection and the air heating device merely functions as combustion air introduction/extraction means for introducing the combustion air into the furnace and exhausting a part of in-furnace combustion gas from the furnace, and the fuel mixing devices 10A, 10B carry out the first step (FIG. 25A) and the second step (FIG. 25B) alternately in a predetermined time interval. In the first step, the mixed gas (fuel gas) of fuel, combustion gas and steam is blown through the device 10A and the combustion gas is extracted from the device 10B. In the second step, the mixed gas (fuel gas) of fuel, combustion gas and steam is blown through the device 10B and the combustion gas is extracted from the device 10A. That is, the high-temperature combustion gas, which is produced in the furnace when the furnace temperature rises, is extracted from the furnace and then, mixed with steam and fuel, and thereafter, re-introduced into the furnace as a high-temperature fuel gas to be mixed with the combustion air and burn in the combustion chamber 1.

In each of the combustion steps, the air heating device 10 and the fuel mixing device 10 introduce the combustion air and the fuel gas into the furnace in directions crossing at a right angle. The combustion air and fuel gas are mixed mainly in a center area of the furnace by a mutually inducing action, and produce flame in vicinity of the tube 5 in a combustion atmosphere of a low oxygen density and a high-temperature.

Figure 26:
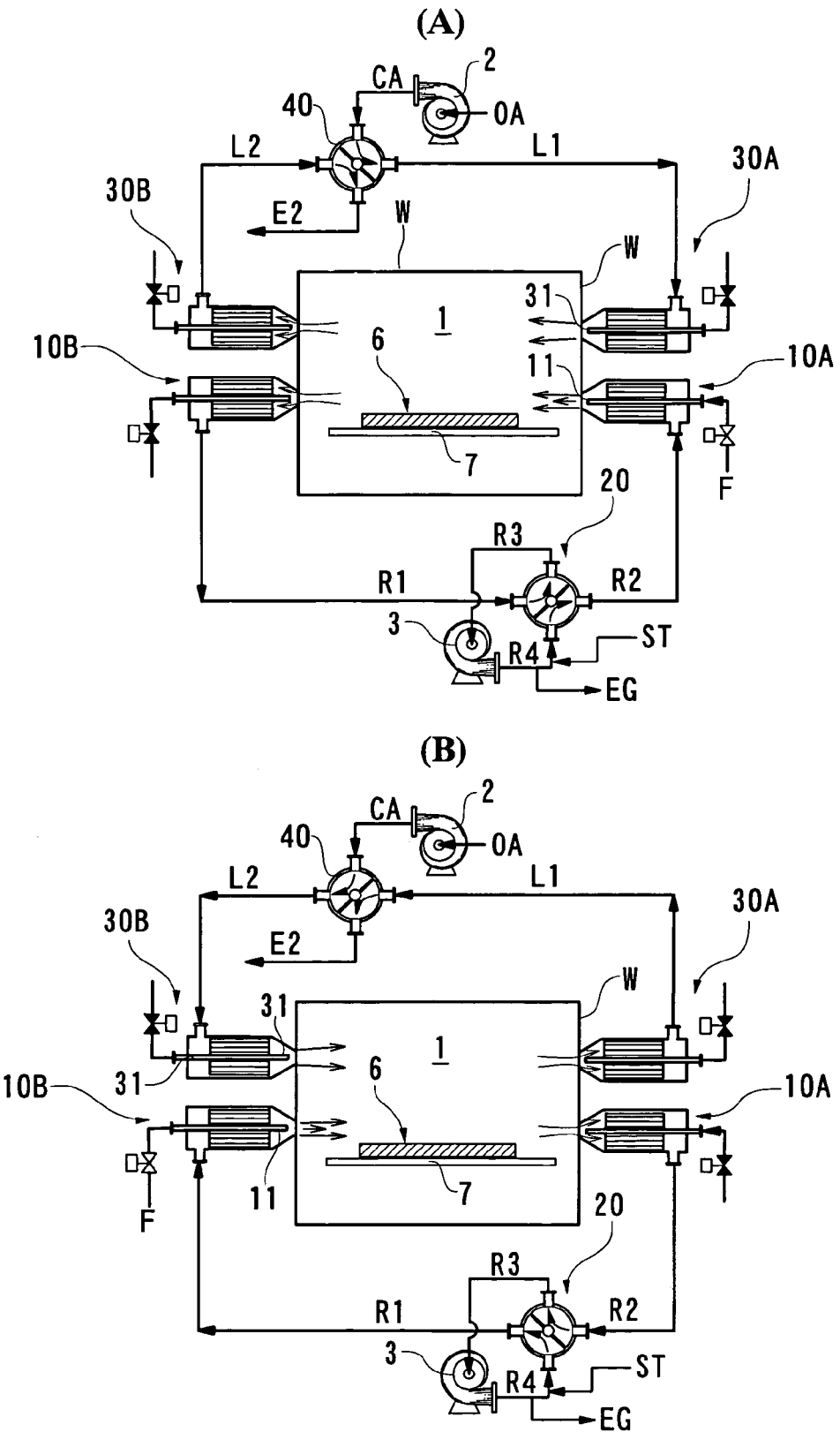
FIG. 26 is a schematic vertical cross-sectional view showing a continuous firing type of heating furnace according to the present invention.

FIG. 26 is a schematic cross-sectional view illustrating an example of heating device wherein the arrangement of combustion system according to the present invention is applied to a continuous firing type of heating furnace. FIG.

26(A) shows a first combustion step of the combustion system and FIG. 26(B) shows a second combustion step thereof.

The heating apparatus as shown in FIG. 26 constitutes a reduction combustion zone in a steal heating furnace or a ceramic-industrial kiln which continuously heats or bakes works such as steel or ceramic materials in a reduction combustion atmosphere. Fuel mixing devices 10A, 10B and air supply devices 30A, 30B are provided on a furnace body W of a heating furnace, in which flame acts on works 6 successively moved on transfer means 7. Similarly to the aforementioned example, first and second combustion steps are alternately carried out in a predetermined time interval. A fuel gas and high-temperature combustion air flowing out from the devices 10A, 10B, 30A, 30B generate flame in vicinity of the work 6.

The fuel gas delivered from the devices 10A, 10B into the furnace forms a lower flow moving along a surface of the work 6, and the high-temperature combustion air delivered from the devices 30A, 30B forms an upper flow moving above the fuel gas flow. The flow of fuel gas at a low oxygen density generates a reduction combustion atmosphere in vicinity of the upper surface of the work 6, and the flame produced by the fuel gas and the high-temperature combustion air acts on the surface of work 6 as a reducing flame.

According to such an arrangement, a flattened flame can be caused for the work 6 located at a center area of the furnace, and a reduction combustion atmosphere surrounding the heated subject can be generated by the fuel injection flow, whereby the heated subject can be heated in a condition to restrict oxidizing effect. For instance, in accordance with the combustion system of the present example, a flattened fuel gas flow at a low oxygen density moving in vicinity of a material can be generated in a metal heating furnace, ceramic-industrial kiln or the like which carries out annealing or baking of material in a combustion atmosphere of reducing flame, whereby a reducing flame combustion atmosphere can be caused near the material.

Although preferred examples according to the present invention have been described in detail, the present invention is not limited to such examples, but may be modified and changed without departing from the scope of the invention as claimed in the attached claims.

For instance, the above described examples employ a four-way valve structure as the change-over means, but change-over means formed by a combination of valves may be employed.

Further, the arrangements of the fuel mixing device and the air heating device are not limited to those described above, but a regenerative heat-exchanger containing a number of regenerators can be employed as the fuel mixing device and air heating device.

Furthermore, with respect to the aforementioned heating apparatus, the fuel mixing device and the air heating device may be positioned to oppose against each other, so that the fuel gas flow and the combustion air flow are introduced into the furnace as being a counterflow.

In addition, a process steam supply system in a factory or plant may be used as the steam supply means as set forth above.

INDUSTRIAL APPLICABILITY

As describe above, a fuel feeding apparatus and method according to the present invention can improve the controllability of mixing process and mixing ratio of fuel and combustion air.

Further, the fuel feeding apparatus and method according to the present invention allow the combustion gas and fuel to be optionally mixed, independently of control of in-furnace recirculation flow.

Furthermore, in accordance with the present invention, a fuel feeding apparatus and method are provided which can produce a fuel gas having new combustion characteristics.

From another aspect of the present invention, a combustion system and method are provided which can improve the controllability of fuel flow entering a combustion area and enable control of characteristics of flame by control of fuel flow, and further, a heating apparatus and method are provided which are capable of controlling properties of flame acting on heated subjects.

The invention claimed is:

1. An apparatus for feeding fuel which has fuel feeding means for feeding the fuel to a combustion area in a furnace, comprising:
   mixing means for mixing the fuel of said fuel feeding means with combustion gas extracted from the furnace and/or steam of steam supply means;
   heating means for heating said combustion gas and/or steam up to a high temperature equal to or higher than 700 deg. C.; and
   fuel gas introduction means for introducing a mixed fluid of said fuel and said combustion gas and/or steam into said combustion area as a fuel gas so as to mix the fuel gas with combustion air supplied to the combustion area by combustion air supply means.

2. An apparatus as defined in claim 1, wherein said mixing means has a mixing area for mixing said fuel with said combustion gas and/or steam, and
   the fuel and the combustion gas and/or steam are introduced into said mixing area for producing said fuel gas to be introduced into said combustion area.

3. An apparatus as defined in claim 1, comprising forced circulation means for inducing said combustion gas from said combustion area through combustion gas extraction means for extracting the combustion gas of the combustion area therefrom, wherein the forced circulation means adds said steam to said combustion gas and delivers the combustion gas to said mixing device under pressure.

4. An apparatus as defined in claim 1, comprising a plurality of said mixing means and passage change-over means for switching a fluid passage of said combustion gas and/or steam leading to said mixing means, wherein said fuel feeding means is provided with fuel control means for switching a fuel supply passage in synchronism with said change-over means.

5. An apparatus as defined in claim 1, further comprising steam heating means for heating steam of said steam supply means up to a temperature equal to or higher than 700 deg. C. and feeding the heated steam to said mixing means.

6. A combustion system comprising said apparatus as defined in claim 1, and said combustion air supply means for feeding the combustion air to the combustion area.

7. An apparatus as defined in claim 2, further comprising combustion gas cooling means for cooling said combustion gas, wherein said mixing area is positioned between said heating means and said combustion area.

8. An apparatus as defined in claim 2, wherein said fuel gas introduction means has a fuel gas injection port opening to the combustion area, and said mixing area is positioned within the fuel gas injection port to be in communication with said combustion area.

9. A combustion system as defined in claim 6, comprising mixing means for partially feeding said combustion gas and/or steam to said combustion air supply means and mixing the combustion gas and/or steam with the combustion air.

10. A combustion system as defined in claim 6, wherein said combustion air supply means has combustion gas exhaust means for exhausting the combustion gas of said combustion area, and a regenerator which is in heat transfer contact with the combustion gas to take a heat accumulation action and which is in heat transfer contact with the combustion air to take a heat emission action, and wherein said combustion air is pre-heated up to a high-temperature equal to or higher than 800 deg. C.

11. An apparatus as defined in claim 7, wherein said cooling means and heating means are provided with a regenerator which is in heat transfer contact with said combustion gas at a high temperature so as to effect heat accumulation, and which is in heat transfer contact with said cooled combustion gas and/or steam so as to effect heat emission.

12. An apparatus as defined in claim 7, wherein said cooling means and heating means are provided with a regenerator which is in heat transfer contact with said combustion gas at a high temperature so as to effect heat accumulation, and which is in heat transfer contact with the cooled combustion gas and/or said steam so as to effect heat emission.

13. A method for feeding fuel in which the fuel and combustion air is fed to a combustion area, said method comprising:
feeding combustion gas extracted from a furnace and/or steam of steam supply means to a mixing area;
feeding said fuel to said mixing area to produce a mixed fluid of the fuel and said combustion gas and/or steam; and
introducing said mixed fluid into said combustion area as a fuel gas so as to mix the fuel gas with the combustion air, thereby causing a combustion reaction of said fuel gas in said combustion area,
wherein said combustion gas and/or steam, or said mixed fluid, is heated up to a high temperature equal to or higher than 700 deg. C.

14. A method as defined in one claim 13, wherein said mixing area of said fuel and said combustion gas and/or steam leads to said combustion area, and said fuel and said combustion gas and/or steam are injected into said mixing area respectively, so that the mixed fluid in the mixing area is introduced into the combustion area as said fuel gas.

15. A method as defined in claim 13, wherein said mixed fluid introduced into said combustion area has a temperature equal to or higher than 700 deg. C.

16. A method as defined in claim 13, wherein said mixed fluid introduced into said combustion area is mixed with said combustion air pre-heated up to a temperature equal to or higher than 800 deg. C.

17. A method as defined in claim 13, wherein said combustion gas has an oxygen density equal to or smaller than 10%.

18. A method as defined in claim 13, wherein a mixing ratio of said combustion gas and/or steam with said fuel is set to be in a range of 1:1~20:1.

19. A method as defined in claim 13, wherein a mixing ratio of said fuel gas and/or steam with said combustion air is set to be in a range of 1:10~20:10.

20. A method as defined in claim 13, wherein a velocity of flow of said fuel gas entering said combustion area is set to be in a range between 10 m/s and 150 m/s.

21. A combustion method including said method for feeding fuel as defined in claim 13, wherein said mixed fluid is introduced into said combustion area as the fuel gas, and the fuel gas is mixed with said combustion air to cause a combustion reaction of said fuel gas in said combustion area.

22. A heating apparatus comprising said combustion system as defined in claim 6.

23. A heating method as defined in claim 21, wherein a position in which said fuel gas is introduced into said combustion area and a position in which said combustion air is introduced into said combustion area are changed in a predetermined interval of time.

24. A method for feeding fuel in which the fuel and combustion air is fed to a combustion area, said method comprising:
feeding combustion gas extracted from a furnace and/or steam of steam supply means to a mixing area;
feeding said fuel to said mixing area to produce a mixed fluid of the fuel and said combustion gas and/or steam; and
introducing said mixed fluid into said combustion area as a fuel gas so as to mix the fuel gas with the combustion air, thereby causing a combustion reaction of said fuel gas in said combustion area,
wherein said combustion gas extracted from the furnace at a high temperature and/or said steam heated up to a high temperature equal to or higher than 700 deg. C. by steam heating means is introduced into said mixing area to be mixed with said fuel.

25. A method for feeding fuel in which the fuel and combustion air is fed to a combustion area, said method comprising:
feeding combustion gas extracted from a furnace and/or steam of steam supply means to a mixing area;
feeding said fuel to said mixing area to produce a mixed fluid of the fuel and said combustion gas and/or steam; and
introducing said mixed fluid into said combustion area as a fuel gas so as to mix the fuel gas with the combustion air, thereby causing a combustion reaction of said fuel gas in said combustion area,
wherein the fuel is mixed with said combustion gas and/or steam after the combustion gas and/or steam is heated up to a high temperature equal to or higher than 700 deg. C.

26. A method for feeding fuel in which the fuel and combustion air is fed to a combustion area, said method comprising:
feeding combustion gas extracted from a furnace and/or steam of steam supply means to a mixing area;
feeding said fuel to said mixing area to produce a mixed fluid of the fuel and said combustion gas and/or steam; and
introducing said mixed fluid into said combustion area as a fuel gas so as to mix the fuel gas with the combustion air, thereby causing a combustion reaction of said fuel gas in said combustion area,
wherein a part of said combustion gas and/or steam is mixed with said combustion air to reduce an oxygen density of the combustion air, and then, said fuel gas is mixed with the combustion air.

27. A method for feeding fuel in which the fuel and combustion air is fed to a combustion area, said method comprising:
feeding combustion gas extracted from a furnace and/or steam of steam supply means to a mixing area;

feeding said fuel to said mixing area to produce a mixed fluid of the fuel and said combustion gas and/or steam; and introducing said mixed fluid into said combustion area as a fuel gas so as to mix the fuel gas with the combustion air, thereby causing a combustion reaction of said fuel gas in said combustion area, wherein said steam is added to said combustion gas to adjust a quantity of steam contained in the combustion gas.

28. A method for feeding fuel in which the fuel and combustion air is fed to a combustion area, said method comprising:

feeding combustion gas extracted from a furnace and/or steam of steam supply means to a mixing area;

feeding said fuel to said mixing area to produce a mixed fluid of the fuel and said combustion gas and/or steam; and introducing said mixed fluid into said combustion area as a fuel gas so as to mix the fuel gas with the combustion air, thereby causing a combustion reaction of said fuel gas in said combustion area, wherein said combustion gas, and/or said steam or said mixed fluid, gains sensible heat which the combustion gas loses upon cooling thereof, whereby said combustion gas and/or said steam, or said mixed fluid, is reheated or heated up to a high temperature equal to or higher than 700 deg. C.

29. An apparatus for feeding fuel which has fuel feeding means for feeding the fuel to a combustion area in a furnace, comprising:

mixing means for mixing the fuel of said fuel feeding means with steam of steam supply means;

steam heating means for heating said steam up to a temperature equal to or higher than 700 deg. C. and feeding the heated steam to said mixing means; and fuel gas introduction means for introducing a mixed fluid of said fuel and said steam into said combustion area as a fuel gas so as to mix the fuel gas with combustion air supplied to the combustion area by combustion air supply means.

30. An apparatus as defined in claim 29, wherein combustion gas extracted from a furnace is further mixed with the fuel of said fuel feeding means by said mixing means, said fuel gas introduction means introduces said mixed fluid of said fuel, said combustion gas and said steam into said combustion area as a fuel gas so as to mix the fuel gas with said combustion air.

31. A combustion system comprising said apparatus as defined in claim 29, and said combustion air supply means for feeding the combustion air to the combustion area.

* * * * *